United States Patent
Lu et al.

(10) Patent No.: US 9,367,604 B2
(45) Date of Patent: *Jun. 14, 2016

(54) SYSTEMS, METHODS, AND INTERFACES FOR EXTENDING LEGAL SEARCH RESULTS

(71) Applicant: Thomson Reuters Global Resources, Baar (CH)

(72) Inventors: Qiang Lu, Pittsford, NY (US); Jack G. Conrad, Eagab, MN (US); Michael Dahn, Farmington, MN (US); William M. Keenan, Macedon, NY (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/885,083

(22) Filed: Oct. 16, 2015

(65) Prior Publication Data

US 2016/0042054 A1 Feb. 11, 2016

Related U.S. Application Data

(63) Continuation of application No. 12/791,480, filed on Jun. 1, 2010, now Pat. No. 9,177,050.

(51) Int. Cl.
*G06F 17/30* (2006.01)
*G06Q 10/10* (2012.01)
*G06Q 50/18* (2012.01)

(52) U.S. Cl.
CPC .... *G06F 17/30598* (2013.01); *G06F 17/30011* (2013.01); *G06F 17/3053* (2013.01); *G06F 17/30722* (2013.01); *G06Q 10/10* (2013.01); *G06Q 50/18* (2013.01)

(58) Field of Classification Search
CPC .......................... G06F 17/30722; G06Q 10/10
USPC ................................... 707/708, 737
See application file for complete search history.

(56) References Cited

U.S. PATENT DOCUMENTS

| 5,265,065 | A | * | 11/1993 | Turtle | ............... G06F 17/30011 |
| 5,715,445 | A | * | 2/1998 | Wolfe | ............... G06F 17/30289 |
| 5,870,770 | A | * | 2/1999 | Wolfe | ............... G06F 17/30728 |
| | | | | | 707/E17.008 |
| 6,289,342 | B1 | | 9/2001 | Lawrence et al. | |
| 6,772,149 | B1 | | 8/2004 | Morelock et al. | |

(Continued)

FOREIGN PATENT DOCUMENTS

WO 2006133017 A1 12/2006

OTHER PUBLICATIONS

"Westlaw International Research Guide" 2005, cited in the International Search Report for corresponding PCT International Application No. PCT/US2010/036913.

(Continued)

*Primary Examiner* — Mahesh Dwivedi

(57) ABSTRACT

The present invention makes legal research more efficient by selecting clusters in response to the behavior of a user (e.g., a legal professional such as a paralegal, lawyer, or judge). The clusters, which are formed prior to the user accessing a legal document (and thus, providing user behavior to a system), are identified to the based upon a set of metadata associated with the legal document. At least two clusters are identified and a signal associated therewith is transmitted to the user. Each cluster is associated with a unique legal topic. Further, each cluster may comprise primary and/or secondary authority.

16 Claims, 21 Drawing Sheets

(56) References Cited

U.S. PATENT DOCUMENTS

| | | |
|---|---|---|
| 7,213,198 B1 | 5/2007 | Harik |
| 8,032,506 B1 | 10/2011 | Gregov et al. |
| 2002/0022956 A1 | 2/2002 | Ukrainczyk et al. |
| 2002/0138529 A1 | 9/2002 | Yang-Stephens et al. |
| 2003/0046277 A1 | 3/2003 | Jackson et al. |
| 2003/0101181 A1 | 5/2003 | Al-Kofahi et al. |
| 2003/0105682 A1 | 6/2003 | Dicker et al. |
| 2003/0115213 A1 | 6/2003 | Mielenhausen |
| 2004/0143796 A1 | 7/2004 | Lerner et al. |
| 2004/0260569 A1 | 12/2004 | Bell et al. |
| 2005/0044487 A1 | 2/2005 | Bellegarda et al. |
| 2005/0203899 A1 | 9/2005 | Anderson et al. |
| 2005/0228788 A1 | 10/2005 | Dahn et al. |
| 2005/0278633 A1 | 12/2005 | Kemp |
| 2006/0041608 A1 | 2/2006 | Miller et al. |
| 2006/0048046 A1 | 3/2006 | Joshi et al. |
| 2006/0287971 A1 | 12/2006 | Armstrong |
| 2007/0027811 A1 | 2/2007 | Jackson et al. |
| 2007/0130100 A1 | 6/2007 | Miller |
| 2009/0094210 A1 | 4/2009 | Reinhardt et al. |
| 2009/0150827 A1 | 6/2009 | Meyer et al. |
| 2010/0030749 A1 | 2/2010 | Dahn |

OTHER PUBLICATIONS

"A Comparison of Document Clustering Techniques," 2000, cited in the International Search Report for corresponding PCT International Application No. PCT/US2010/036913.

International Search Report for corresponding PCT International Application No. PCT/US2010/036913, published Dec. 9, 2010.

* cited by examiner

Figure 31

◆ 313A Products Liability
　◆ 313AII Elements and Concepts
　　◆ 313Ak157 Persons Entitled to Sue
　　　◆ 313Ak159 k. Privity of Contract as Requirement in General. Most Cited Cases
　　　　(Formerly 313Ak54, 272k27)
◆ 313A Products Liability　　KeyCite Citing References for this Headnote
　◆ 313AIII Particular Products
　　◆ 313Ak256 k. Ladders and Scaffolds. Most Cited Cases
　　　(Formerly 313Ak54, 272k27)

If one engaged in the business of manufacturing ladders, to be put upon the market for sale and use, so negligently constructs a ladder that by reason of such negligence it will obviously endanger the life or limb of any one who may use it, and knowing of such defects, and that the same are so concealed that they are not likely to be discovered, puts the ladder in his stock for sale, he is liable for injuries caused by such negligence to one into whose hands the ladder comes for use in the usual course of business, though there be no contract relation between him and the person injured.

Figure 4A

Source query (2004368747): "convicted felon second amendment right"
　"limited narrowly tailored specific exceptions restrictions"
　"felon firearm possession statute"　406K1 406K3

Candidate 1 (2002683357): "possession firearm" "convicted felon"
　"statute"　406K2

Candidate 2 (2002683357): "second amendment right" "bear arms"
　"possession firearm"　406K1

Candidate 3 (2002683357): "possession firearm" "previously convicted
　felon" "commerce clause"　406K3

Figure 4B

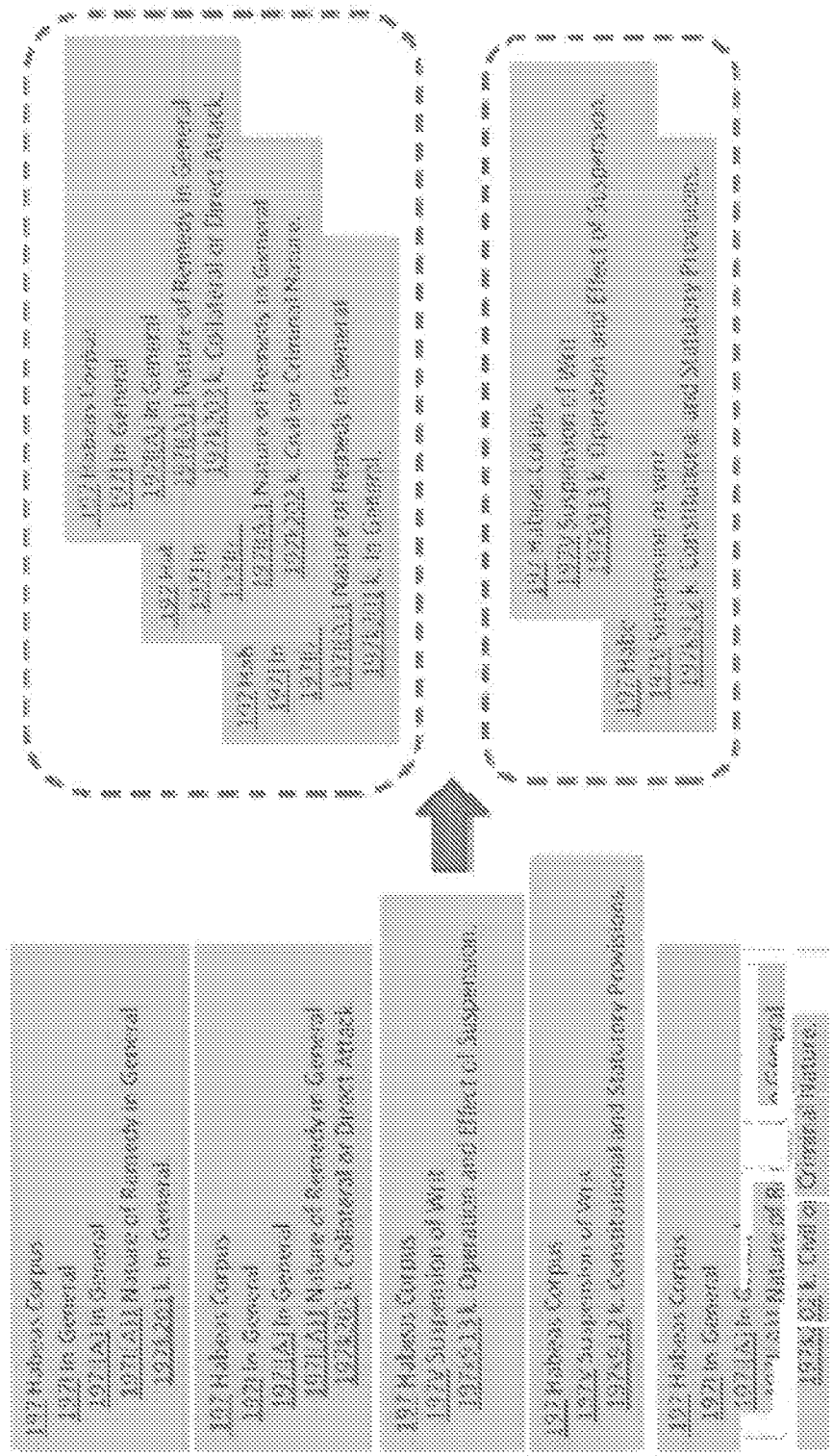

| Source | Feature Name | Description |
| --- | --- | --- |
| jCaRE-WP service | WPTFIDFScore | The TFIDF score from the jCaRE-WP (wordpair) service |
| | WPProbsumScore | The Probsum score from the jCaRE-WP (wordpair) service |
| jCaRE-KN service | KNTFIDFScore | The TFIDF score from the jCaRE-KN (key numbers) service |
| | KNProbsumScore | The Probsum score from the jCaRE-KN (key numbers) service |
| jCaRE-CI service | CITFIDFScore | The TFIDF score from the jCaRE-CI (citation) service |
| | CIProbsumScore | The Probsum score from the jCaRE-CI (citation) service |
| jCaRE services | numofCaREs | The number of jCaRE services which make recommendations |
| Noun Phrases (NPs) between queries | maxNPSimScore | The maximal text similarity between NPs between queries |
| | meanMaxNPSimScore | The mean-max text similarity between NPs between queries |
| | commonNPCountPercentage | The percentage of common NPs between queries |
| | commonWDCountPercentage | The percentage of common words between queries |
| Key numbers (KNs) between queries | KNProfileSimScore | The KNs profile similarity score |
| | commonKNCountPercentage | The percentage of common KNs between queries |
| | commKNTopicCountPercentage | The percentage of common KN topics between queries |

Figure 4H

SYSTEMS, METHODS, AND INTERFACES FOR EXTENDING LEGAL SEARCH RESULTS

CROSS-REFERENCE TO RELATED APPLICATION

The present application is a continuation application of U.S. patent application Ser. No. 12/791,480, filed on Jun. 1, 2010, which claims priority to U.S. Provisional Patent Application Ser. No. 61/217,522 filed Jun. 1, 2009, the contents of which are incorporated herein in entirety. U.S. patent application Ser. No. 12/791,480 also claims priority to, and is a continuation in part application of, U.S. patent application Ser. No. 11/538,749 filed Oct. 4, 2006 entitled "Systems, Methods, and Software for Identifying Relevant Legal Documents" (now Publication No. U.S. 2008/0033929 A1), which claims priority to U.S. Provisional Patent Application No. 60/723,322 filed Oct. 4, 2005, the collective contents of all of which are incorporated herein in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2010, Thomson Reuters Global Resources.

TECHNICAL FIELD

The present invention relates to systems, methods and interfaces for providing information in response to a computerized search for legal content.

BACKGROUND

The American legal system, as well as some other legal systems around the world, relies heavily on a concept know as stare decisis. This Latin phrase means as "to stand by things decided." The phrase "stare decisis" is itself an abbreviation of the Latin phrase "stare decisis et non quieter movere" which means "to stand by decisions and do not move that which is quiet." The American legal system practices stare decisis by deciding similar cases in similar fashion and not overruling previously established law absent a good reason to do so.

Legal professionals, such as paralegals, judges and lawyers, constantly apply the principle of stare decisis by using legal content to support their arguments and positions. In general, there are two types of sources of legal content, primary sources and secondary sources. Primary sources are judicial opinions dealing with the same legal issue. Primary sources are said to be "binding" if the primary source is from a higher court (or the same exact court) than the court currently deciding the legal issue and the higher court is in the "chain of command" of the court currently deciding the issue. For example, the U.S. Supreme Court's opinions are binding on all other courts deciding the same issue. However, a federal district court's opinion from, e.g., New York, is not binding upon a federal district court in Pennsylvania deciding the same issue. The opinion of the New York court is considered persuasive (but not binding) primary authority. Secondary sources comprise other legal content such as law review and other scholarly articles briefs, motions, and administrative decisions.

Ideally, legal professionals would always be able to support their positions and arguments with primary authority that is binding. However, this is not always practical due to many reasons including, for example, new issues arising in the law which courts have yet to address. Further, parties may also have different interpretations of how or if a particular previous judicial opinion applies to their dispute. In fact, parties may not even agree upon what the legal issue that needs to be resolved.

In order to provide clients with fast and superior legal services, many legal professionals use computerized research to attempt to find primary authority that is binding. This helps control legal costs while making legal professionals choosing to use computerized research more efficient.

However, even with computerized research, legal professionals cannot be fully aware of all potential legal issues due to the vast amount of legal information legal professionals may have to review. For example, West Publishing Company of St. Paul, Minn. (doing business as Thomson West) (hereinafter "West") offers the ability for legal professionals to conduct computerized research on over 100 million documents. West collects legal content from various sources and makes them available electronically through its Westlaw® information-retrieval system. (Westlaw® is a trademark of West). Searchable documents include documents from both primary and secondary sources. Further, the West Key Number™ System, which provides classified summaries of legal points, made in judicial opinions, is also searchable (West Key Number™ is a trademark of Thomson West). The summaries, known as Headnotes, are classified into more than 90,000 distinct legal categories, and can be used for a variety of purposes, such as evaluating the relevance of legal opinions to particular legal issues. Secondary resources, such as American Law Reports (ALR®), include about 4,000 in-depth scholarly articles, each teaching about a separate legal issue.

Multiple systems used by legal professionals, including Westlaw®, have addressed the ability of a legal professional performing a search to quickly become familiar with other potentially relevant legal issues. For example, Westlaw® currently provides legal professionals with a feature known as ResultsPlus®. This feature is described in U.S. patent application Ser. No. 11/028,476 filed Jan. 3, 2005, the contents of which are incorporated herein in entirety, entitled "Systems, Methods, Interfaces and Software for Extending Search Results Beyond Initial Query-Defined Boundaries." Essentially, this feature provides the legal professional with a screen with links to: (1) a first set of documents responsive to their search query; and (2) a second set of documents including documents outside the boundaries of the original search query. The feature docs so in a manner that causes the first set of documents and the second set of documents to be displayed separately within a single graphical user interface ("GUI").

There exists a need to further improve the searching of legal documents by legal professionals.

SUMMARY OF THE INVENTION

We have recognized that legal professionals are more efficient in conducting legal research if the second set of documents which is outside the boundaries of the original search query is organized into clusters. More specifically, we have invented a method comprising receiving a first signal indicative of a selection of a legal document associated with a set of metadata; based upon the set of metadata, picking a first cluster of legal documents and a second cluster of legal documents, the first cluster of legal documents being associated with a first legal topic and the second cluster of legal documents being associated with a second legal topic; and transmitting a second signal relating to the first cluster of legal documents and the second cluster of legal documents.

Advantageously, the present invention permits legal professionals to conduct legal research more effectively by providing the legal professional with information regarding clusters of documents associated with a document the legal professional has viewed and/or accessed in some fashion.

Other advantages will be apparent to those skilled in the art based upon the remainder of the specification, including the figures.

BRIEF DESCRIPTION OF THE FIGURES

FIGS. 3A through 3I are screenshots of what a user may see when executing methods in accordance with the invention; and FIGS. 4A through 4L relate to the generation of clusters of legal documents.

DETAILED DESCRIPTION

Background

Figure 1:
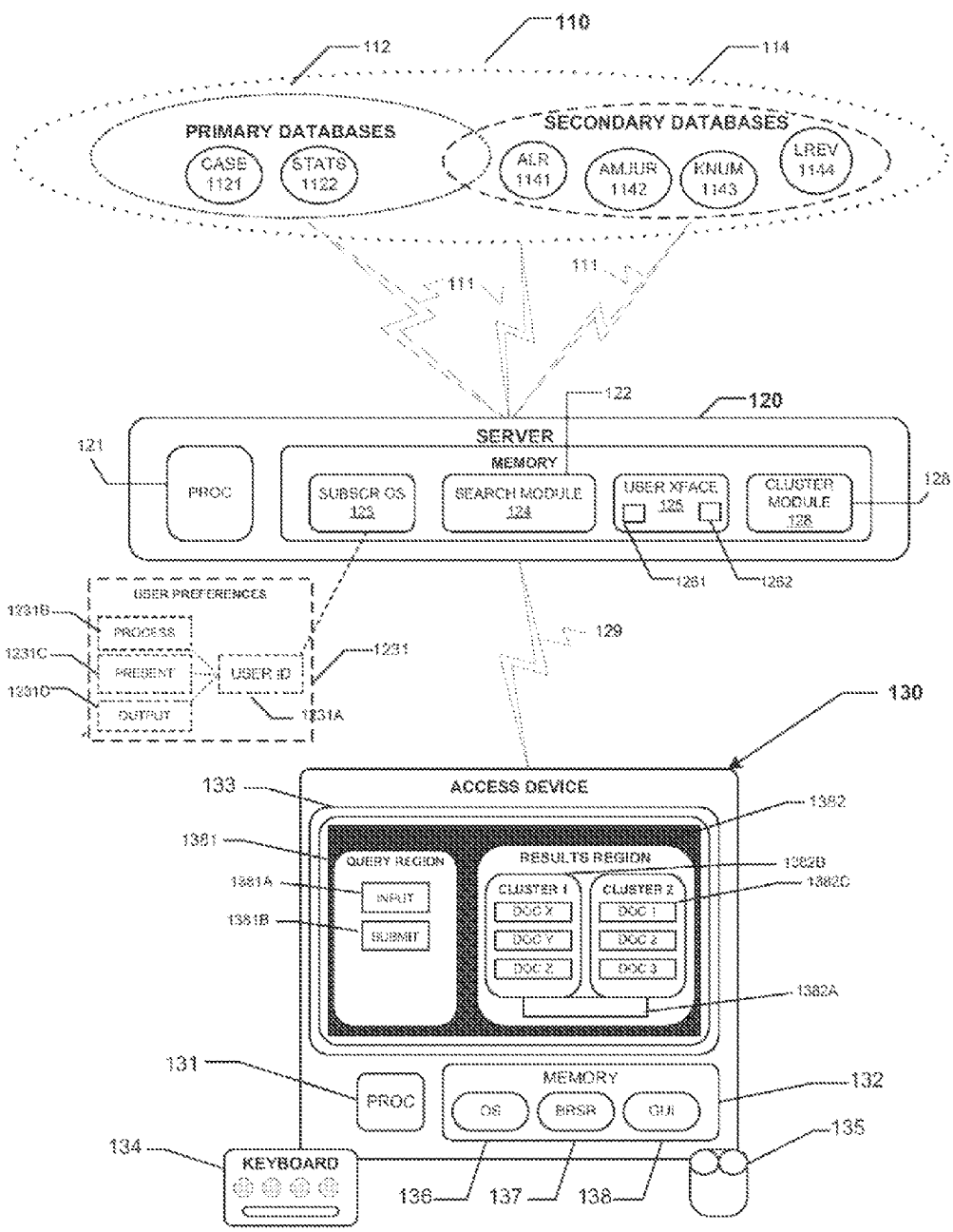
FIG. 1 is a diagram of a system corresponding to one embodiment of the invention.

In addition to providing this background section, this detailed description will describe a system in which the invention may be implemented, including the system's components and structure. Next, the detailed description will describe the operation of the system, including a legal professional's interactions with the system and resulting displays associated with clusters of legal documents. Next, the detailed description will describe how clusters of legal documents are originally generated. Finally, the detailed description will describe how these clusters may be used to provide the user with additional relevant documents or additional relevant clusters.

As used herein, "topic" and/or "legal topic" shall mean a legal area, issue, and/or subject matter. An example of this is "search and seizure." A sub-topic and/or "legal sub-topic" shall mean a more granular classification of a topic and/or legal topic. Examples of this are "search and seizure—traffic stop" and "search and seizure—expectation of privacy." A cluster shall mean a set of documents grouped according to a topic that the documents hold in common. An example of a cluster is a group of legal documents relating to "search and seizure." Although typically a heterogeneous (containing more than one content type of document) set of documents, it is possible for a cluster to be a homogeneous set of documents (i.e., containing only one content type of document). A noun phrase is a word group that contains a noun and its modifiers. Examples of noun phrases are "product liability action" and "our favorite restaurant." A segment is a portion of a document that may be defined by the particular topic it addresses. By way of example, a court decision discussing and finding a party liable for fraud and then discussing damages is one document with two segments, namely "fraud" and "damages." The words pick, choose, select, identify, and all respective forms thereof, shall be used interchangeably.

Also, a document is "associated" with a cluster if it is relevant to the topic of the cluster. Further, a document is a "member" of a cluster if it is both relevant to the topic associated with a cluster and is important in the context of the topic. Still further, a first document is said to be "similar" to a second document if they share a sufficient number of features such as noun phrases and citation history.

Finally, it should be noted that there are many different types of legal documents including but not limited to case law, statutes, regulations, administrative decisions, secondary sources, briefs, pleadings, motions, memoranda, expert witness testimony, court orders, scholarly articles, and jury verdicts. Further, these documents arise in the federal, state and/or local context (e.g., a federal court opinion as opposed to a state court opinion). Also, at least some of these types of documents (e.g., non-court decision documents) may be associated with notes of decisions which serve as alerts to the legal professional accessing the documents that the document (or, e.g., the contents of the document such as a statute) has been involved in litigation. Some of these documents are primary authority and some are secondary authority.

System Components and Structure

FIG. 1 shows an exemplary online information-retrieval system 100. System 100 may include one or more databases 110, one or more servers 120 (only one shown), and one or more access devices 130 (only one shown).

Databases 110 includes a set of primary databases 112 and a set of second databases 114. Primary databases 112, in the exemplary embodiment, include a case law database 1121 and a statutes databases 1122, which respectively include judicial opinions and statutes from one or more local, state, federal, and/or international jurisdictions. Secondary databases 114 include an ALR® database 1141, an AMJUR® database 1142, a West Key Number™ (KNUM) Classification database 1143, and a law review (LREV) database 1144. Other databases (not shown) may include financial, tax, scientific, and/or health-care information. Also, it should be noted that primary and secondary may also connote the order of presentation of search results and not necessarily the authority or credibility of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120 is generally representative of one or more servers for serving data in the form of web pages or other markup language forms. This may be done with known associated applets, ActiveX controls, remote-invocation objects, or other related software and data structures to service clients of various "thicknesses." More particularly, server 120 includes a processor module 121 and a memory module 122.

Processor module 121 includes one or more local or distributed processors, controllers, or virtual machines. In the exemplary embodiment, processor module 121 assumes any convenient or desirable form.

Memory module 122 takes the exemplary form of one or more electronic, magnetic, or optical data-storage devices. Memory module 122 is comprised of a subscriber database 123, a search module 124, a user-interface module 126, and a cluster module 128.

Subscriber database 123 includes subscriber-related data for controlling, administering, and managing pay-as-you-go or subscription-based access of databases 110. Search module 124 includes one or more search engines and related user-interface components. These search engines receive and process user queries and/or other user activity against one or more of databases 110, including the primary databases 112 and the secondary databases 114. The secondary databases may provide, for example, topical treatises, state practice guides, statutes, and/or law review articles to augment searches of case law database. User-interface module 126 includes machine readable and/or executable instruction sets for wholly or partly defining web-based user interfaces, such as search interface 1261 and results interface 1262, over a communications link 129 such as a wireless or wireline communications network on one or more accesses devices, such as access device 130.

Cluster module 128 includes machine readable and/or executable instruction sets. Cluster module 128 interacts, directly and/or indirectly, with the processor 121 and other modules in the memory 122. Cluster module 128 also interacts, directly and/or indirectly, with the databases 110 via communications links 111 and with access device 130 via communications link 129.

Access device 130 is generally representative of one or more access devices, all of which may simultaneously interact with the server 120. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135, such as a "mouse."

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a GUI 138. In the exemplary embodiment, operating system 136 takes the form of a version of the Microsoft® Windows® operating system, and browser 137 takes the form of a version of Microsoft® Internet Explorer®. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A and a query submission button 1381B. Search-results region 1382 is also defined in memory and upon rendering includes a first region 1382A, a second region 1382B, and a third region 1382C. Region 1382A includes one or more interactive control features, such as features A1, A2, A3 for accessing or retrieving one or more corresponding search result documents from one or more of databases 110 via server 120. Region 1382A, in one embodiment, is the region from which a legal professional may select a legal document. Regions 1382B and 1382C are, respectively, regions for displaying information relating to the first cluster of legal documents and the second cluster of legal documents. Such information may include respective titles and/or citations for the corresponding documents. For each such documents and/or cluster, this information may be in the form of a hyperlink or other browser-compatible command input that provides access, ultimately, to the documents and/or cluster of documents via server 120 and databases 110.

System Operation

Figure 2:
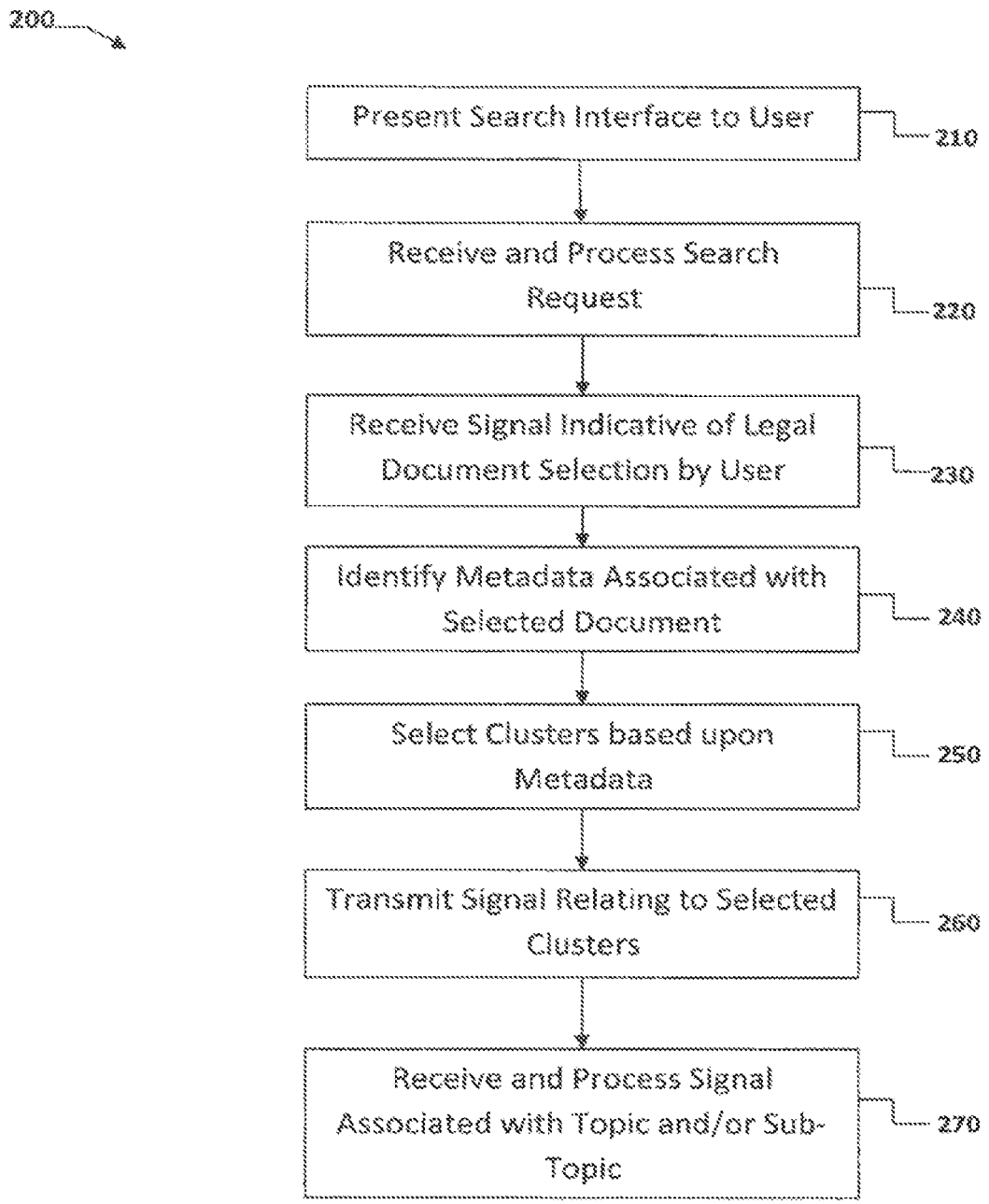
FIG. 2 is a flowchart corresponding to the operation of the system of FIG. 1.

FIG. 2 is a flowchart 200 corresponding to operation of the system 100 of FIG. 1. Flowchart 200 includes blocks 210 through 270 which are arranged and generally described sequentially. However, those skilled in the art realize that other embodiments of the invention may execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary flowchart of FIG. 2 (and elsewhere in this description) applies to software, hardware, and/or firmware implementations.

Figure 3A:
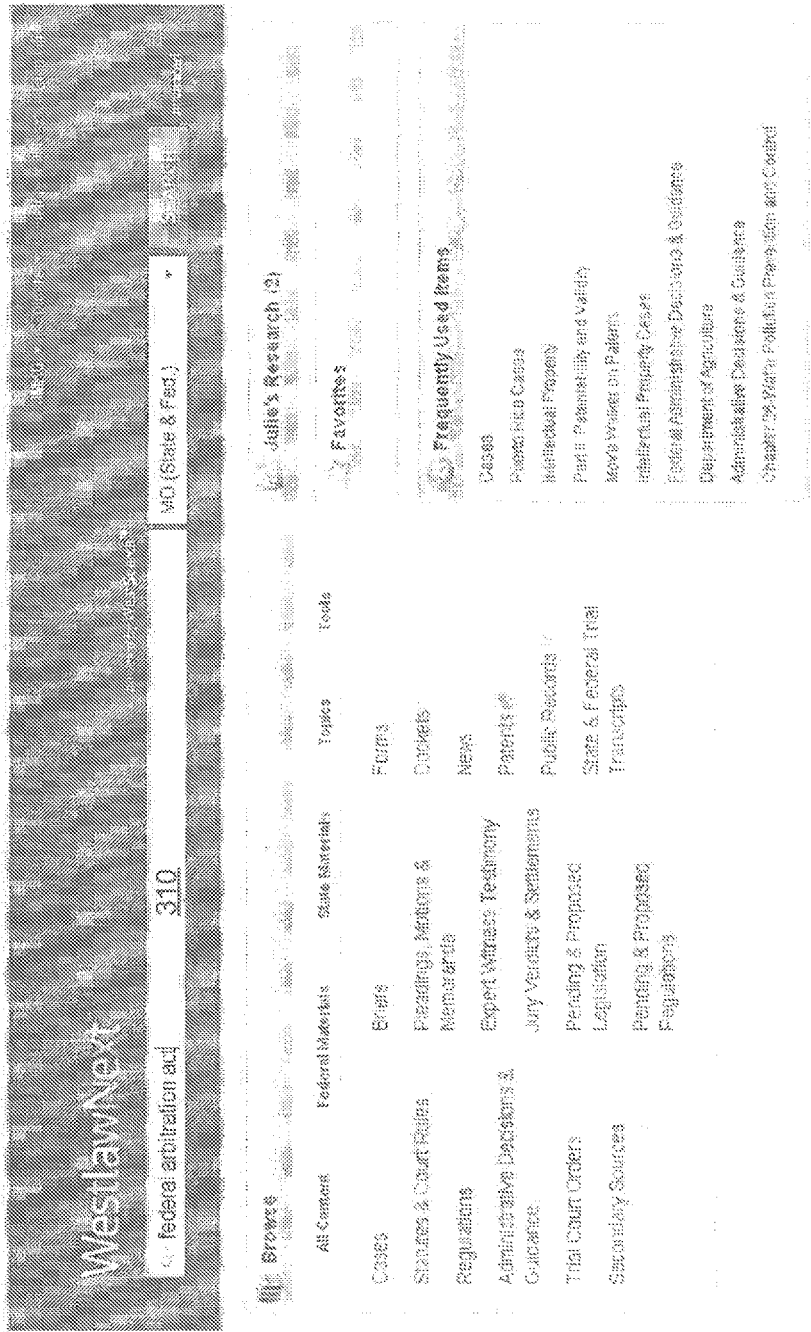

The remaining description in the System Operation section refers to FIGS. 2 through 3I wherein FIG. 2 outlines the operation of the system 100 and FIGS. 3A through 3T are various screenshots as seen from the perspective of a user (e.g., legal professional) using a access device 130 to access the WestlawNext™ online information retrieval system.

As shown in block 210, the system 100 generates a signal that ultimately causes a search interface to be presented to a user. The signal is output from server 120 to access device 130 via communications link 129 and stored in memory 132. GUI 138 provides search region 1381 on the access device 130. It should be noted that this step assumes that the user operating access device 130 has already successfully logged into the system 100 by supplying an internet-protocol (IP) address for an online information-retrieval system and correct login information (e.g., user identification and password), via the access device 130 and communications link 129, to the system 100. An exemplary search interface screen 300 presented to the user is depicted in FIG. 3A. The search interface 300 includes a query input region 310 in which the user of access device 130 may enter a search query by typing text and submitting the query to system 100.

Figure 3B:
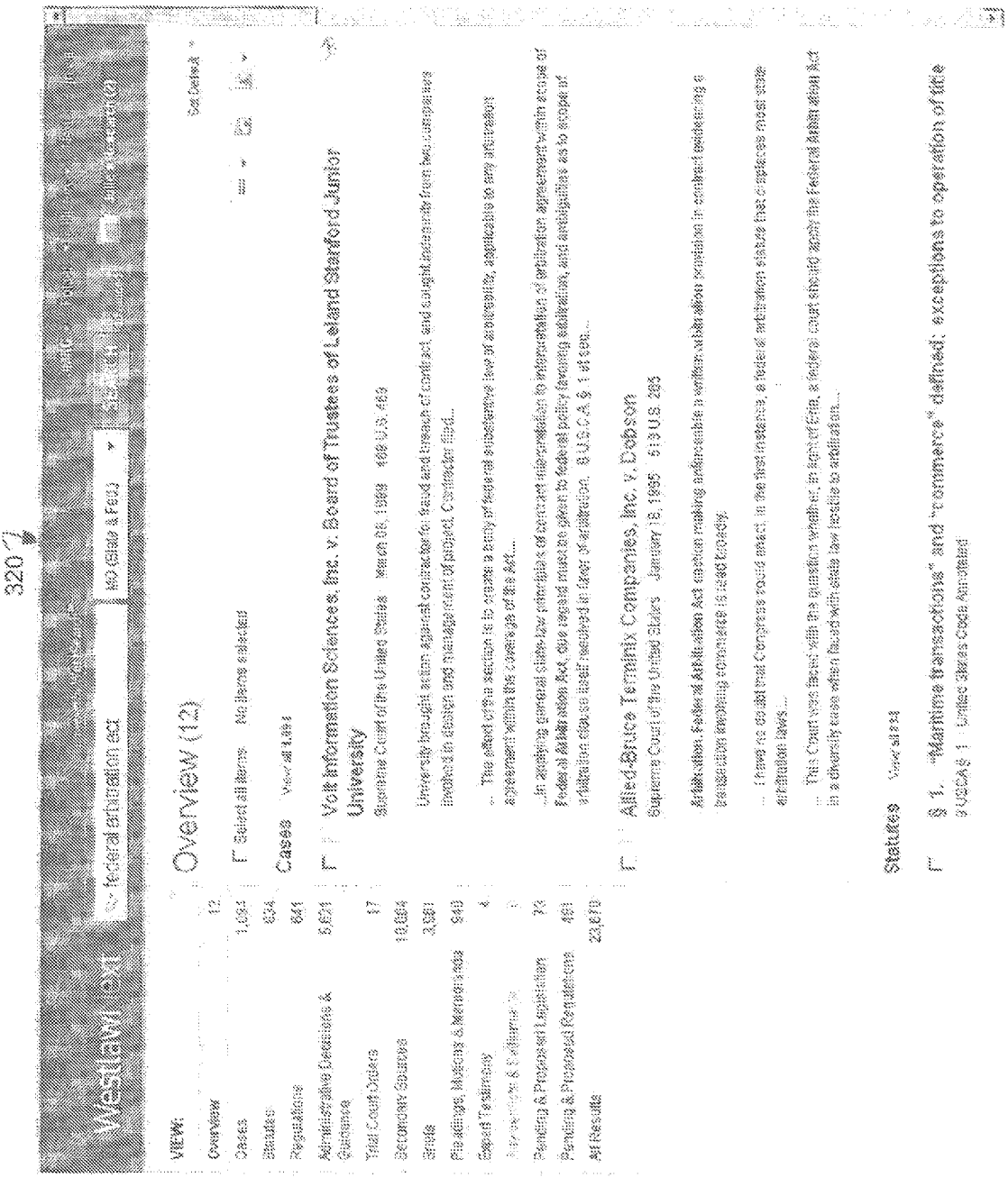

As shown in block 220, the system 100 receives the query, also known as a search request, and processes the request. To process the request, the server 120 communicates with at least one database from databases 110 and identifies a set of legal documents in response to the search request. Next, the server 120, via the processor 121 and memory 122, generates a signal associated with the set of legal documents identified in response to the search request. The signal is transmitted over communications link 129 to access device 130. The access device 130 displays a screen 320 to the user based upon this signal. Such a screen 320 is depicted in FIG. 3B. It should be noted that FIG. 3B does not contain information (e.g., titles, words describing, hyperlinks to, etc. . . . ) relating to a first cluster of legal documents and a second cluster of legal documents.

Figure 3C:
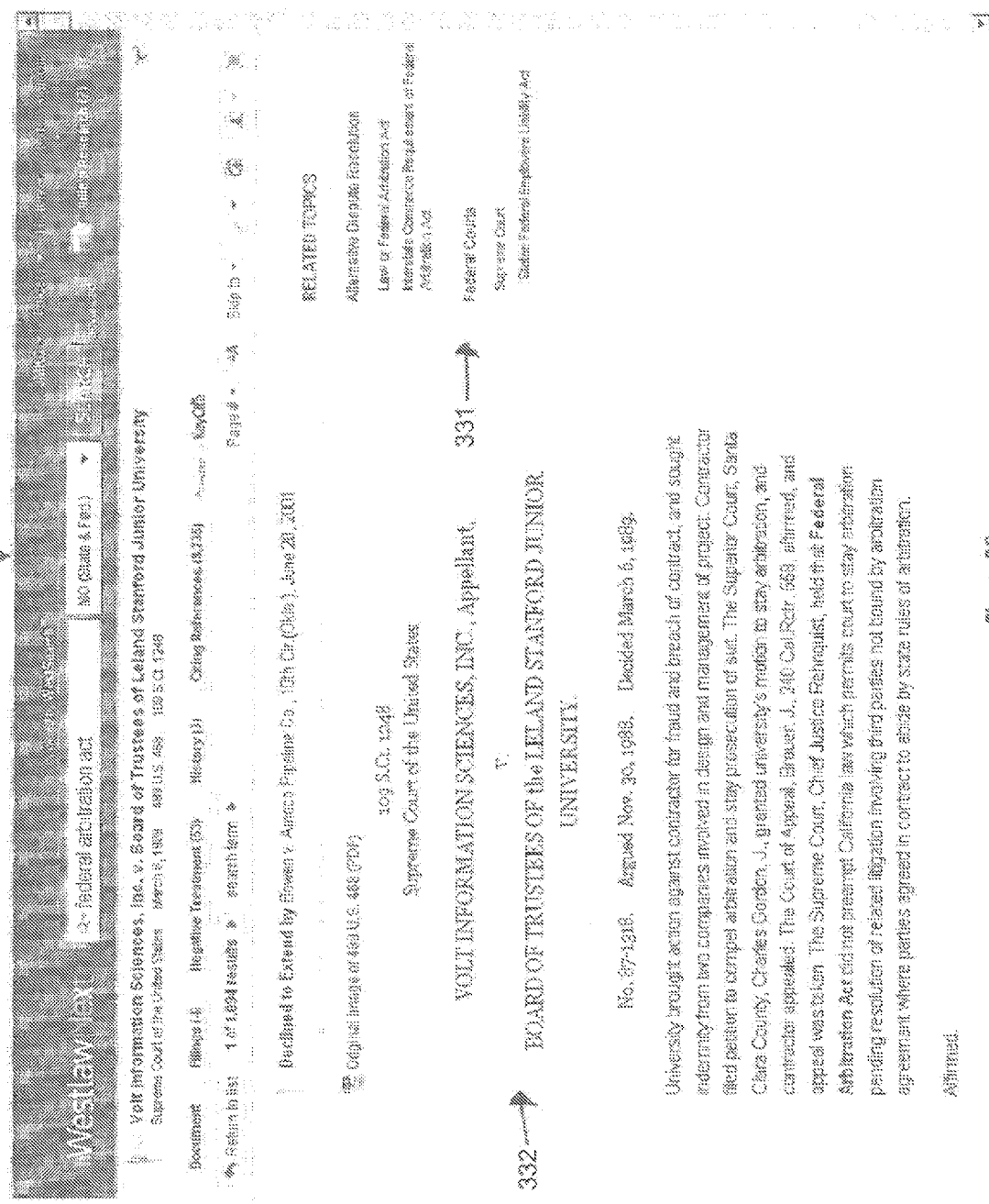

As shown in block 230, the system 100 receives another signal generated by the user of access device 130 via communications link 129. This signal is indicative of the user accessing a document from the set of legal documents provided in response to the search request. Accessing may be done in a variety of manners including but not limited to the user: (1) viewing the document on the access device 130; (2) printing the document; (3) emailing the document; and (4) setting up an alert with respect to the document. As shown block 240, the processor 121 and memory 122 begin to process this signal. This is done by identifying a set of metadata associated with the accessed or selected document. This set of metadata is then used to pick a first cluster of legal documents and a second cluster of legal documents as shown in block 250. The manner in which clusters are picked is by using a pre-computed set of clusters associated with each document. The association process, described in more detail in Cluster Generation section below, uses a combination of similarity measures between the document and/or document metadata and the cluster and/or cluster metadata. These measures include statistics (such as term-frequency and inverse document-frequency) regarding terms, noun phrases, word pairs, text, citations, associated queries, and other items. As shown in step 260, a signal relating to these clusters is generated and transmitted from server 120 to access device 130 via communications link 129. Next, the access device 130 displays a screen 330 to the user based upon this signal. Such a screen 330 is depicted in FIG. 3C. It should be noted that the right hand portion 331 of screen 330 is related to the clusters. It should be noted that the right hand portion 331 of screen 330 is analogous to regions 1382B and 1382C of FIG. 1. Also, portion 332 of screen 330 is analogous to region 1382A of FIG. 1.

Figure 3D:
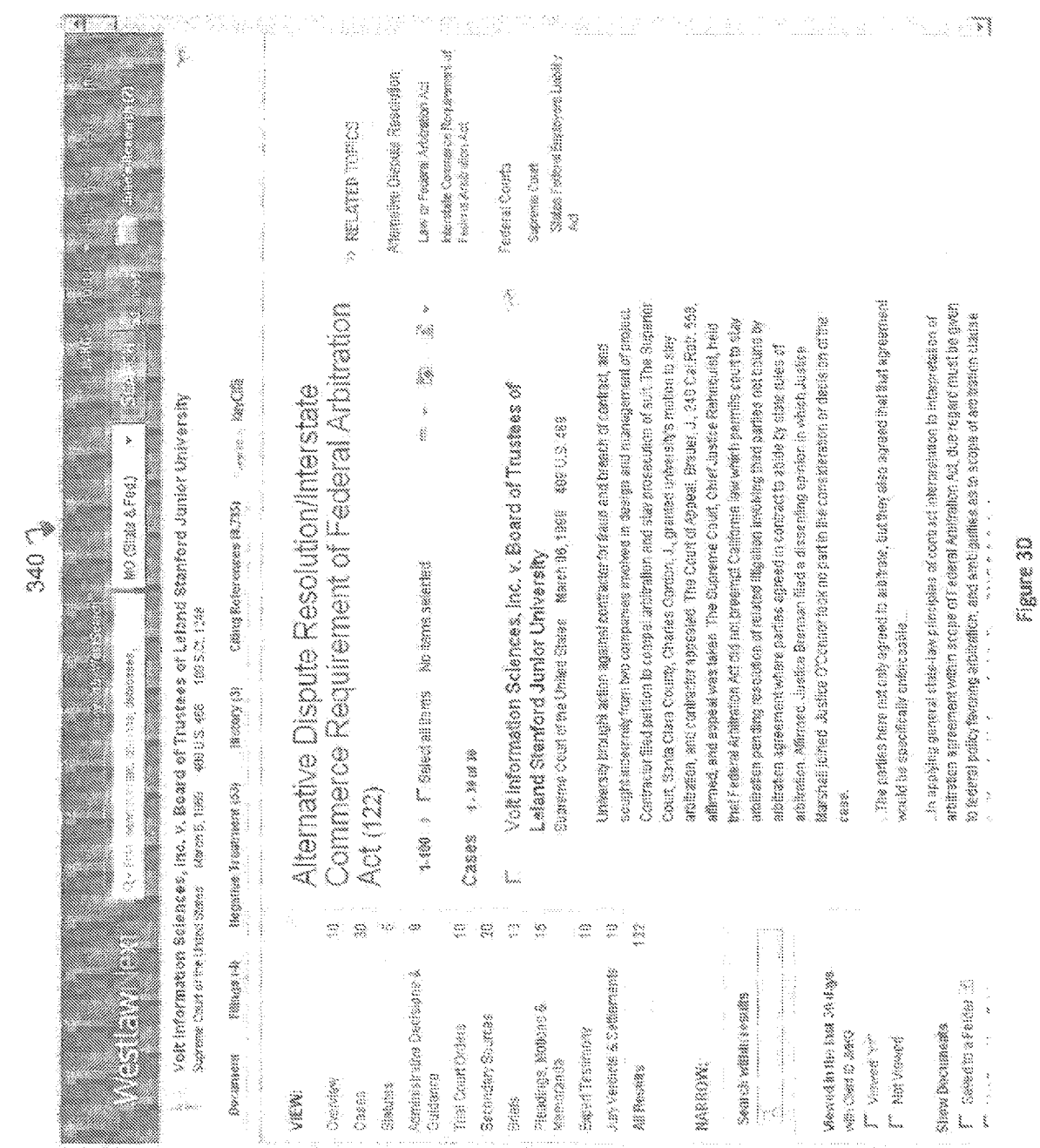
Figure 3E:
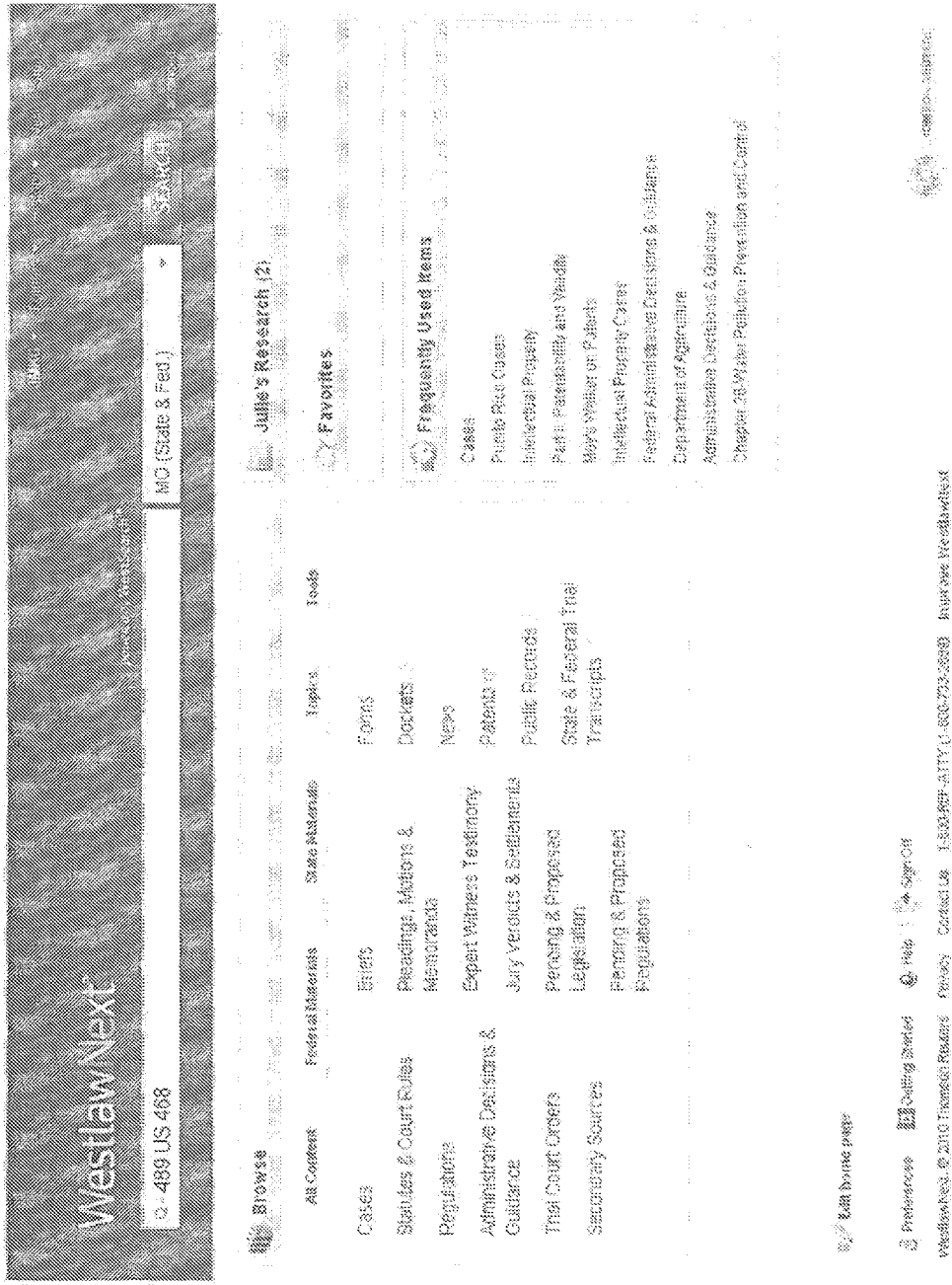
Figure 3F:
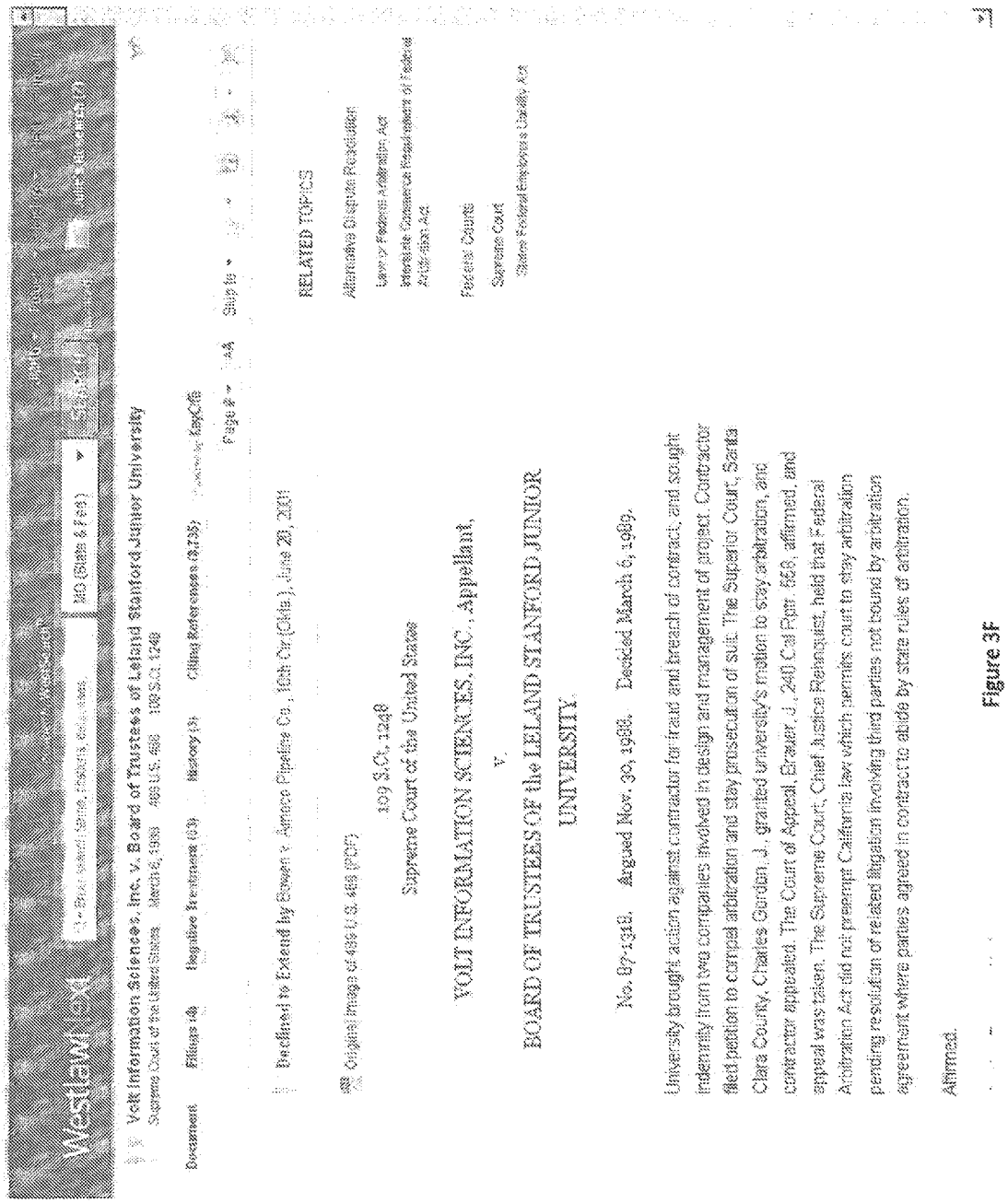
Figure 3G:
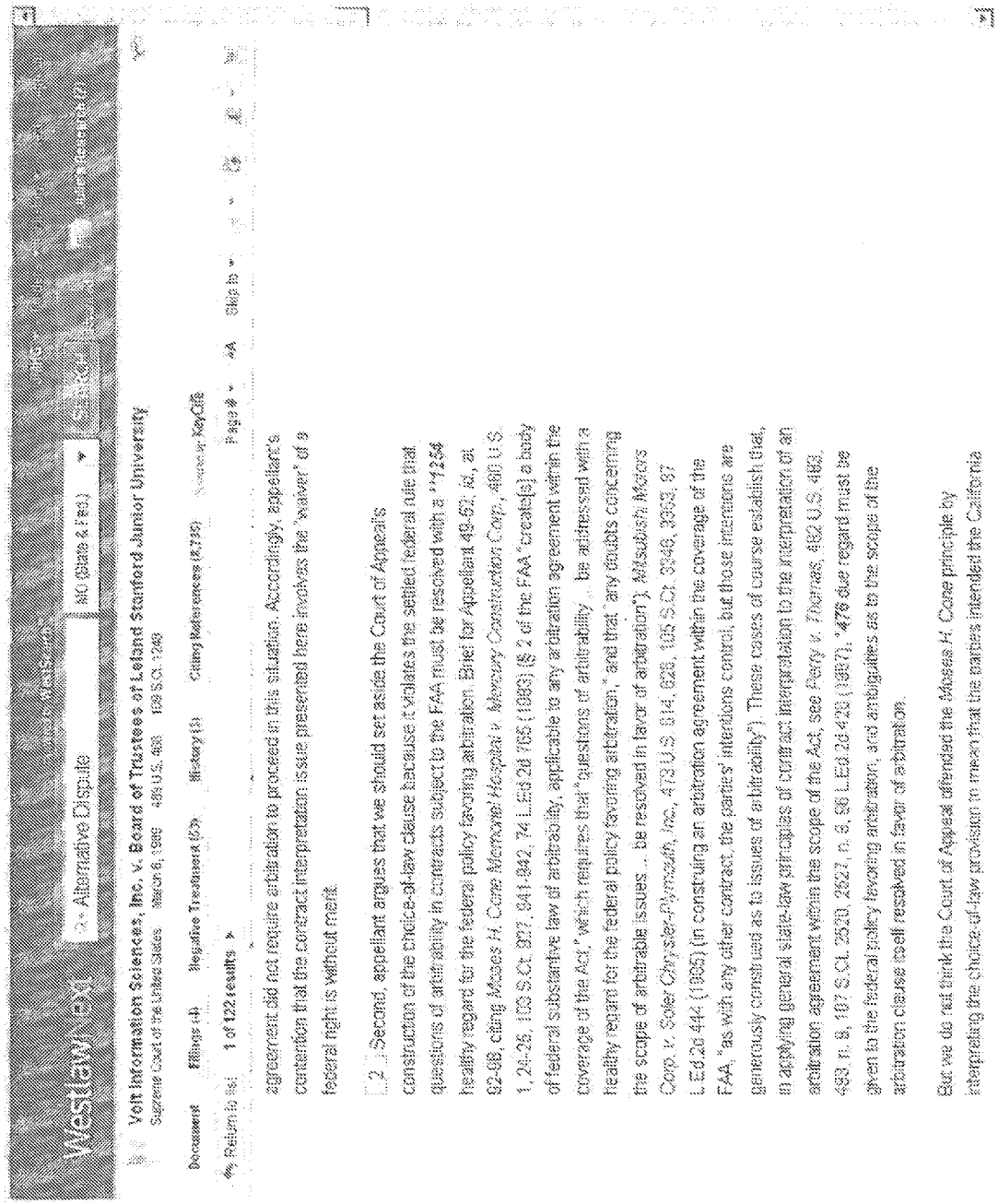
Figure 3H:
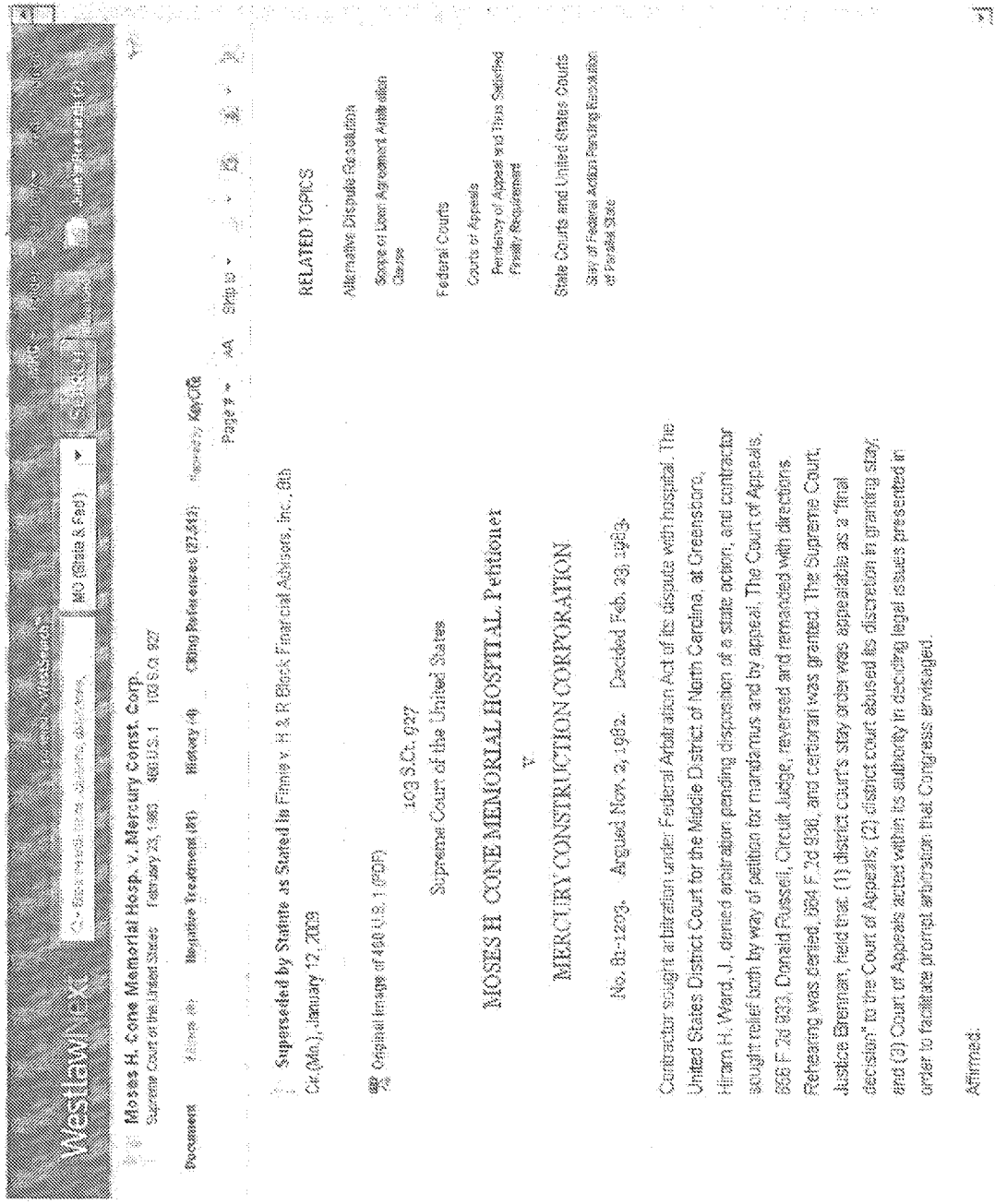

At this point, the user, who had originally search for "federal arbitration act" (see query input region 310 of FIG. 3A), realizes that what is more interesting to the user is a set of documents relating to the topic entitled "Alternative Dispute Resolution" (see generally the right hand portion 331 of FIG. 3C showing multiple clusters). More specifically, the user wants more information on the sub-topic entitled "Interstate Commerce Requirement of [the] Federal Arbitration Act." When the users clicks on the appropriate hyperlink relating to the sub-topic, a signal is sent from the access device 130 to the server 120 via the communications link 129. As shown in block 270, the server 120 receives and processes this signal by identifying legal documents associated with the topic and sub-topic "Alternative Dispute Resolution/Interstate Commerce Requirement of [the] Federal Arbitration Act." To process the signal, the server 120 communicates with at least one database from databases 110 and identifies legal documents relevant to the sub-topic (based upon clusters and "sub-clusters"). Next, the server 120, via the processor 121 and memory 122, generates a signal associated with the legal documents and transmits it over communications link 129 to access device 130. The access device 130 displays a screen 340 to the user. Such a screen 340 is depicted in FIG. 3D.

FIGS. 3E through 3I show another series of screen shots relating to the invention. Essentially they illustrate that another scenario under which signals relating to multiple clusters may be transmitted to an access device. It does not have to be initiated solely in response to a "word" or "text" search (as shown in input region 310 of FIG. 3A). For example, FIG. 3E begins with a user searching for a document associated with a particular citation, namely 489 U.S. 468, a citation to a Supreme Court case.

Cluster Generation

FIGS. 4A through 4J disclose various algorithms, features and applications for generating and using clusters of legal documents. As discussed in detail below, in one embodiment, the cluster module 128 of FIG. 1 defines and generates a cluster by identifying one or more legal issues among case-law documents, populates the cluster with a rich spectrum of legal documents based upon the cluster's legal issue, summarizes the content represented by the generated cluster, and provides various associations between generated clusters and documents, queries, and folders. Although the description below refers to a Westlaw® system environment, one skilled in the art will appreciate that the disclosed algorithms, features and applications are applicable to other online legal research systems.

To identify one or more legal issues among case-law documents, the cluster module 128 implements a bottom-up strategy. For example, in one embodiment, the cluster module 128 identifies the legal issues inside one document, and then merges similar issues together to form clusters for all documents.

The cluster module 128 identifies legal issues using a Headnotes grouping defined for a case. For example, for cases deemed important on the Westlaw® system, Headnotes (e.g., editorial annotations) are added during the publishing process. Headnotes provide a succinct summary of a legal issue raised in the case and are also associated with one or more Westlaw® Key Numbers™, described below. An example of a Headnotes grouping with Key Numbers™ is shown in FIG. 4A.

Advantageously, by grouping Headnotes based on their "similarities", the cluster module 128 identifies major legal issues inside a case. In one embodiment, to determine similarity, the cluster module 128 first computes several features from the Headnotes and then applies an agglomerative clustering algorithm. Exemplary similarity features computed by the cluster module 128 include a Key Numbers™ similarity feature, a Headnote text similarity feature, a KeyCite® similarity feature, and a Common Noun Phrase frequency feature.

The Key Numbers™ similarity feature is based on a Key Number™. West's Key Number System® is a taxonomy defined on the Westlaw® system that categorizes legal topics into a hierarchical structure. The cluster module 128 computes the similarity between Key Numbers™ based on the global co-existence of Key Numbers™ inside cases. In one embodiment, the cluster module 128 determines Key Number™ topic commonality.

The Headnote text similarity feature is based on text describing a legal issue. For example, in the Westlaw® system, each Headnote typically includes an amount of text describing a legal issue. The cluster module 128 computes the similarity between two Headnotes' text using wordpair features extracted from them. In one embodiment, the cluster module 128 uses a hybrid approach which combines the TF-IDFs (term-frequency-inverse document-frequency) and probabilities of wordpairs.

The KeyCite® similarity feature is based on relationships between cases. In the Westlaw® system, KeyCite® data maintains citing and cited relationships between cases (several down to the Headnotes level). In addition, KeyCite® data includes information concerning the importance/authoritativeness of a case, and information regarding similarity among Headnotes (for example, if two or more Headnotes are co-cited together in several cases, they tend to discuss closely related legal issues). U.S. Pat. No. 7,529,756 issued on May 5, 2009 entitled "System and Method for Processing Formatted Text Documents in a Database" (filed Nov. 22, 2000 and assigned U.S. patent application Ser. No. 09/746,557) and U.S. patent application Ser. No. 12/432,380 entitled "System and Method for Processing Formatted Text Documents in a Database" filed on Apr. 29, 2009 describe KeyCite® in detail and are both incorporated in their entirety. The cluster module 128 computes the frequency of how often Headnotes have been co-cited in other cases.

The Common Noun Phrase frequency feature is based on a noun phrase (NP) whose head is a noun or a pronoun, optionally accompanied by a set of modifiers. In the Westlaw® system, NPs typically represent a legal term in a Headnote. The cluster module 128 computes the frequency of two common NPs between Headnotes, which provides a measure of how similar Headnotes are at the "concept" level. In one embodiment, the cluster module 128 uses the NP frequency feature as a supplement to the Headnote text similarity features, since a NP may be considered an n-gram for a particular value of n.

Once the cluster model 128 computes one or more similarity features between Headnotes, the cluster module 128 implements an agglomerative clustering algorithm to group similar Headnotes. For example, in one embodiment, the cluster module 128 merges two Headnotes together while maximizing the following equations, $$H_2 = \text{maximize } \frac{\tau_2}{\varepsilon_1}$$

$$\text{where, } \tau_2 = \text{maximize} \sum_{r=1}^{k} \sum_{h_i \in S_r} \cos(h_i, C_r)$$

$$\varepsilon_1 = \text{minimize} \sum_{r=1}^{k} n_r \cos(C_r, C)$$

$$C_r = \frac{\sum_{h \in S_r} h}{n_r}$$

$$C = \frac{\sum_{S_r \in S} \left( \frac{\sum_{h \in S_r} h}{|S_r|} \right)}{k}$$

in which $\tau_2$ is the intra-cluster similarity and $\varepsilon_1$ is the inter-cluster similarity. In these equations,
k being the total number of clusters, $S_r$ being one of the k clusters, and S being the collection of all the clusters,
$h_i$ being one of the Headnote in the cluster $S_r$,
$C_r$ being the center of one cluster,
C being the center of all the clusters
$n_r$ being the number of Headnotes in the cluster $S_r$.

In one embodiment, the cluster module 128 scans through all the Headnote feature vectors, which is one common representation for a set of features used, and identifies two feature vectors which have the maximal $\tau_2$ value. The cluster module 128 also computes the value $\varepsilon_1$ at approximately the same time. The cluster module 128 stops the scanning iteration when the value $\varepsilon_1$ is less than a predefined threshold. The cluster module 128 stops the scanning iteration when the value of $\varepsilon_1$ is less than a predefined threshold. The range of the threshold is between 0.0 to 1.0, and preferable, it is set to be 0.45.

Advantageously, by utilizing a predefined threshold, the cluster module 128 avoids setting up the number of clusters for the data set in advance, which many of the known clustering algorithms require. The cluster module 128 applies this technique to cases with Headnotes and resulting topics are used in a cluster merging process described below which produces clusters for cases.

Once topics are determined, the cluster module 128 is configured to merge similar clusters. For example, legal topics detected in different cases using the before-mentioned techniques may be very similar, i.e., they are concerned with the same or closely related legal issues. By merging similar clusters together, the cluster module 128 partitions the legal space into meaningful clusters.

In one embodiment, the cluster module 128 mergers clusters using a two step process. First, the cluster module 128 performs a candidate selection process.

The candidate selection process includes generating, training and applying three different CaRE® indices to eligible topics. CaRE® stands for Classification and Recommendation Engine. CaRE® is described in detail in U.S. Pat. No. 7,062,498 which issued on Jun. 13, 2006 entitled "Systems, Methods, and Software for Classifying Text from Judicial Opinions and other Documents" (filed on Dec. 21, 2001 and assigned U.S. patent application Ser. No. 10/027,914), U.S. Pat. No. 7,580,939 which issued on Aug. 25, 2009 entitled "Systems, Methods, and Software for Classifying Text from Judicial Opinions and other Documents" (filed on Aug. 30, 2005 and assigned U.S. patent application Ser. No. 11/215, 715), and U.S. patent application Ser. No. 12/545,642 entitled "Systems, Methods, and Software for Classifying Text from Judicial Opinions and other Documents" filed on Aug. 21, 2009, all of which are incorporated in their entirety.

In one embodiment, the cluster module 128 performs the following indexing functions: CaRE® word-pairing indexing, CaRE Key Numbers™ indexing, and CaRE® citation indexing.

In CaRE® word-pair indexing, the cluster module 128 associates each topic with a number of Headnote texts. The cluster module 128 computes word-pairs of the text and indexes them. The cluster module 128 retrieves a list of topics based on the similarities between word-pair profiles.

In CaRE Key Numbers™ indexing, the cluster module 128 associates each topic with a list of Key Numbers™ via Headnotes. The cluster module 128 then computes indexed Key Number™ profiles. The cluster module 128 then retrieves a list of topics based on the commonalities between Key Number™ profiles.

In CaRE® citation indexing, the cluster module 128 links each topic to one or more cases, each case is further linked to other cases via KeyCite® information (contain both citing and cited information). The cluster module 128 also computes citation profiles that are indexed. The cluster module then retrieves a list of topics based on common citation patterns between citation profiles.

Advantageously, by aggregating the recommendations from the three generated CaRE® indices, the cluster module 128 generates a list of candidates for each of the topics.

Second, from the list of candidates generated from the selection process, the cluster module 128 determines for each cluster whether the cluster is "similar" to an input topic, and thus should merged with the topic. In one embodiment, for each topic identified, the cluster module 128 generates a query during the Headnotes grouping phrase described previously. The query can include noun phrases and Key Numbers™. An example is shown in connection with FIG. 4B. From the query, along with the associated cases, the cluster module 128 determines several features. Exemplary features calculated by the cluster module 128 include Noun Phrases (NPs) similarity—which includes a global maximal score between pair-wise NPs, mean of maximal score between pair-wise NPs, percentage of common NPs, and percentage of common words, Key Numbers™ (KNs) similarity—which includes a Key Number™ profiles similarity score, percentage of common KNs, and percentage of common KN topics, Co-citation feature—which describes the normalized number of documents cited by both associated seed cases, and Co-click feature, which calculates the normalized number of sessions that have both associated seed cases. The Co-citation feature describes the normalized number of documents cited by both associated seed cases, and is computed using the following formula:

$$\text{cite\_sim}(c_i, c_j) = \frac{\text{cite}(c_i \cap c_j)}{\text{cite}(c_i \cup c_j)}$$

in which cite($c_i \cap c_j$) is the count of other legal documents citing both seed cases ci and cj. Also, cite($c_i \cup c_j$) is the count of legal documents citing either seed cases ci or cj.

The co-click feature calculates the normalized number of sessions that have both associated seed cases and is be computed using the following formula:

$$\text{coclick\_sim}(c_i, c_j) = \frac{\text{click}(c_i \cap c_j)}{\text{click}(c_i \cup c_j)}$$

in which click($c_i \cap c_j$) is the count of sessions in which both seed cases ci and cj were clicked. Also, click($c_i \cup c_j$) is the count of sessions in which either seed cases ci or cj were clicked.

In one embodiment, the cluster module 128 uses these generated features to train a support vector machine ("SVM") ranker model. SVMs and ranking is well known in the art. In order to provide target data for the training of the model, the cluster module 128 generates a set of "silver" preference grades automatically that measure overlaps between recommended cases from the queries through a search engine process. In order to provide target data for the training of the model, the cluster module 128 generates a set of "silver" preference grades automatically by measuring the overlaps between retrieved cases using the queries associated with the clusters through a search engine process. The search engine is described in detail in U.S. patent application Ser. No. 11/538, 749 filed Oct. 4, 2006 entitled "Systems, Methods, and Software for Identifying Relevant Legal Documents" (now Publication No. U.S. 2008/0033929 A1). By ranking the scores of the candidates using the features via the SVM model, the cluster model 128 generates a cluster by merging selected candidates with a seeding topic based on the ranked scores. A list of clusters can then be produced by exhaustively repeating this process for each of the topics such that one is either merged with other topics or becomes a seeding topic.

Once the list of clusters is selected to be merged, the cluster module 128 generates labels. A label displays the "aboutness" of a cluster and reflects a summary of the content inside the cluster. The content of a populated cluster can include cases, statutes, regulations, administrative decisions, analytic materials, briefs, expert witness testimony, jury verdict reports, state trial court orders, pleadings, motions and memoranda as well as other legal documents. Furthermore, the cases and some of the other documents will also include Headnote texts and Key Numbers™. The catchline of a Key Number™ is a short description of a defined legal topic, and it is hierarchically structured such that the first portion is often referred to as the Key Number™ topic, such as "Negligence" in FIG. 4C, and subsequent portions are often referred to as Key Number™ sub-topics, while the last portion is often referred to as the leaf level.

In one embodiment, the cluster module 128 generates a hierarchical label structure that includes a topic, optional sub-topic, and a noun phrase from cases. The topic and sub-topic parts are derived from Key Number™ catchlines, which are precise and hierarchically structured phrases describing various legal issues. The noun phrase is selected from Headnote texts inside a cluster. Examples of a cluster label is shown below wherein the bold portions represent the topic and sub-topic, and the italic portion is the NP.

Securities Regulation/State Regulation/Investment Contract Security

Schools/Teachers' Duties and Liabilities/Governmental Immunity

Typically, a cluster contains a certain number of Key Numbers™, typically those assigned to the Headnotes contained in the cluster. To generate the topic and sub-topic portion of the label, the cluster module 128 computes a frequency of the Key Numbers™ which results in major topics included in the cluster being determined. Once a major topic has been identified, the cluster module 128 traverses the catchlines among Key Numbers™ in the major topic to determine a sub-topic. In one embodiment, the cluster module 128 traverses the catchlines until a divergence is detected based on a majority voting scheme. An example of label generation for topics is shown in connection with FIG. 4C wherein the label is shown in box 410. An example of a majority voting scheme is one where the top n post-divergence sub-topics are considered (where n might be, for example 7) and which selects the sub-topic that is the most frequently occurring within the candidate set.

The cluster module 128 generates the noun phrase portion by extracting all the Headnote texts inside a cluster. In one embodiment, only those Headnotes in the major Key Number™ topics are selected by the cluster module 128 for this process. Several features are derived for each of the noun phrases, and the top scored noun phrase (NP) is selected by the cluster module 128 as part of the label. For example, in one embodiment, the several features include the length of the NP, the term frequency of the composite NP, the term frequency of the NP's terms considered jointly, and the TF-IDF score using normalized TF, As used above, TF stands for term frequency within the given document, DF stands for document frequency within the given collection, and IDF stands for inverse document frequency or the reciprocal of the document frequency. In the given embodiment, weights are determined for this set of features so as to optimize the performance of the label selection process based on empirical evidence from a label grading process. It is also worth noting that for NP scoring and selection purposes an NLP simplified version of the extracted NPs are used (stopped, stemmed, etc.), By contrast, for presentation purposes, a canonical (original) form of the NP is used for user readability.

Because of the importance of each cluster possessing a label that is unique across the set of clusters, two types of uniqueness (or duplication) checks are performed. In order to apply these checking processes to the entire cluster set, the clusters are first ranked by a fitness function that relies on many factors including but not limited to the number of initial cases in the given cluster, and additional features such as the popularity of the cases in the cluster (based on citations and based on user selection), the number of jurisdictions represented, the average age of the cases in the cluster, and the average age of the Key Numbers™ in the cluster. Such a fitness function effectively enables one to rank the clusters by a quality metric.

Once the clusters are ranked according to the fitness function, the labeling process is applied to the highest quality cluster first, then the next highest, etc. . . . At the same time, the resulting labels are recorded and if a given label has already been assigned to a previously processed cluster, the candidate label is rejected in favor of the next candidate label that has not been previously assigned. Similarly, a semantic representation of each label is recorded, and each candidate label is also assessed for its semantic uniqueness. If a highly semantically similar label has already been assigned, a label can be rejected for a less semantically similar label. Processing for this semantic comparison process includes basic natural language processing such as stopping, stemming, term deduping, etc. A threshold may also be invoked such that if the core constituent tokens in two labels being compared are 80% similar, they are considered semantically similar, and the candidate will be rejected in favor of the next candidate that is not found to be semantically similar using this threshold.

Once all of the clusters are identified and defined in the legal space by the cluster module 128, various legal documents are associated with the predefined legal clusters. For example, when a legal document is presented for display in an online legal research system, such as Westlaw®, all the legal topics discussed in the document are automatically identified and associated with related clusters, which can relay all related cases, statutes, regulations, and other documents that discuss the same legal issues as in the original document. To relay all the related documents, in one embodiment, the cluster module 128 applies the search engine process as described in Publication No. U.S. 2008/0033929 A1 using the generated query of a cluster. The query of a cluster comprises of a number of noun phrases and key numbers. The selection of the noun phrases and key numbers are based on their importance to the defined legal topics using the similar features as in the labeling process. By adding key numbers into the query of a cluster, the cluster module 128 can tailor the search engine to retrieve the most relevant cases, statutes, regulations, and other documents either online (in real-time) or offline (pre-population).

Figure 4C:
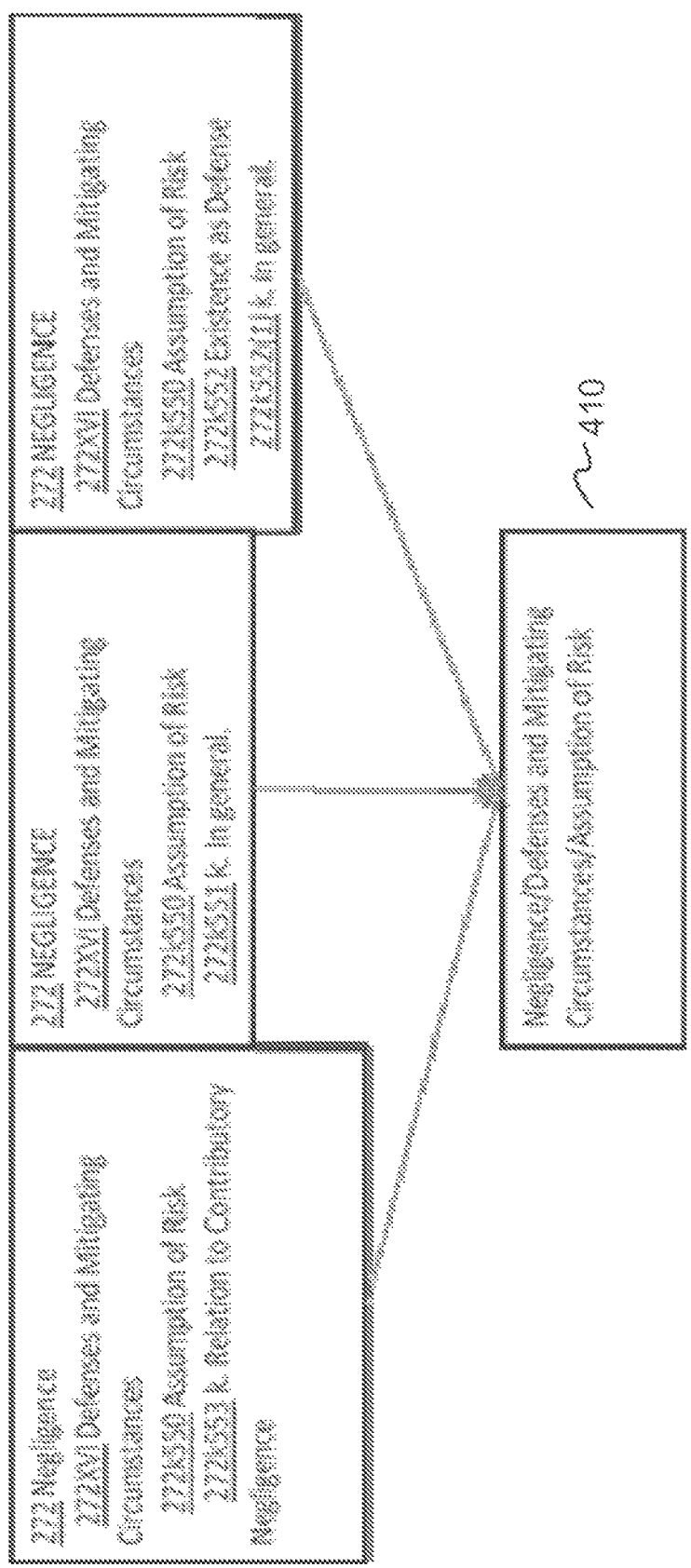
Figure 4D:
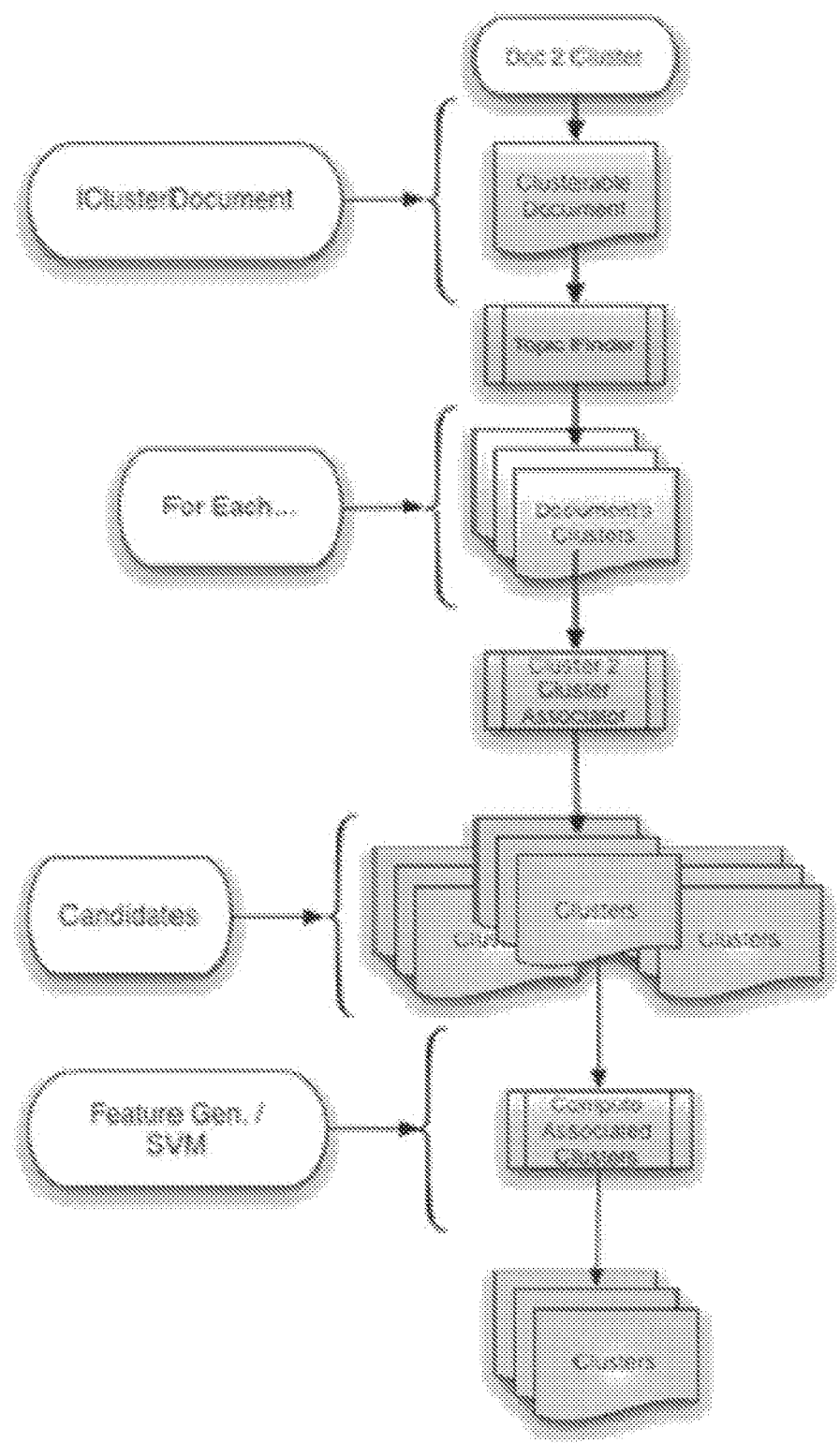

An example workflow of document cluster association is shown in connection with FIG. 4D. As shown in FIG. 4D, in one embodiment, for an incoming document, a list of legal topics described in the document is determined by the cluster module 128. For each topic, a list of similar clusters is associated and recommended.

Figure 4E:
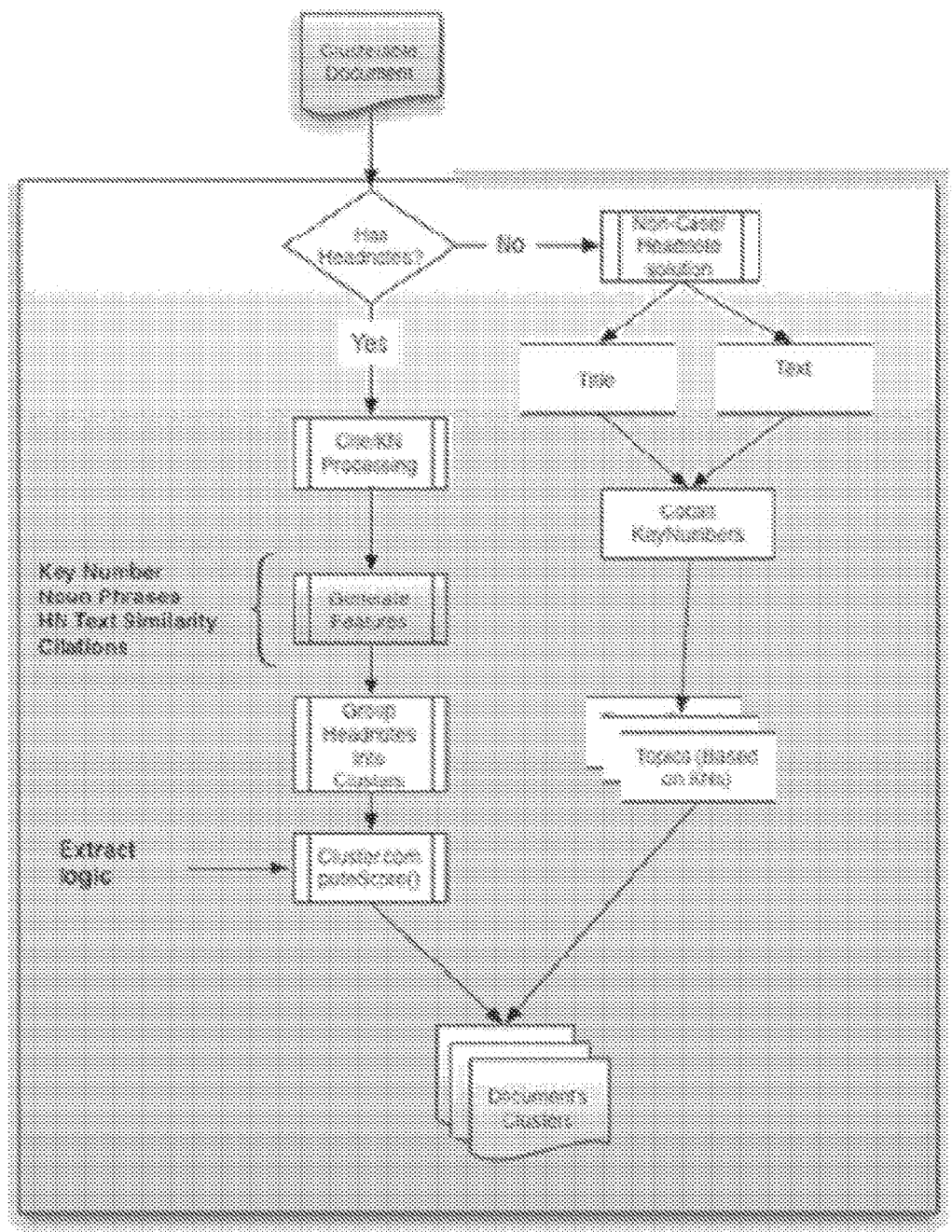

Depending on the metadata available, four different techniques are implemented by the cluster module 128, as illustrated in FIG. 4E. For documents with Headnotes defined (cases, some administrative decisions and briefs), the cluster module 128 process operates similarly to the process described in connection with finding legal issues via Headnotes grouping discussed above.

For some statutes and regulations that include attached notes of decisions (NODs)—a compilation of cases that construe or apply the Statutes or Regulations, the NODs are detailed into the Headnote level for each of the case. As such, the cluster module 128 identifies Key Number™ information from them. The cluster module 128 then groups these Key Numbers™ based on their catchlines such that Key Numbers™ with the most common sub-topics are grouped into one group. An example of Key Numbers™ grouping is shown in connection with FIG. 4F.

As shown in the FIG. 4F example, five (5) Key Numbers™ are shown and after grouping by the cluster module 128, three Key Numbers™ 197K201, 197K202, and 197K203 are grouped into one group since they have common sub-topics up to 197I(A)1 ("Nature of Remedy in General"), and two Key Numbers™ 197K912, 197K913 are grouped in another group for the sub-topic 197V ("Suspension of writ"). These grouped Key Numbers™ define the topics of the document.

For documents with citing documents and no Headnotes or NODs, the cluster module 128 incorporates two pieces of information into its method: one is from all the Key Numbers™ of the cited cases and another is from Key Numbers™ suggested by CaRE-KNA™ using the document text. KNA stands for Key Number™ Assignments. The cluster module 128 groups these two sets of Key Number™ by their topics and then sorts them based on topic popularity. The Key Numbers™ from the cases side with the highest topic popularity that agree with the Key Numbers™ from the CaRE-KNA™ side describing the topic level are selected by the cluster module 128 to generate legal topics for the document. Groupings, similar to those shown in FIG. 4F, are made by the cluster module 128. One grouping is from all the Key Numbers™ of the cited cases and another is from Key Numbers™ suggested by CaRE-KNA™ service using the summarized document text. In one embodiment, the summarized document text comprises the first 2,000 characters of the document. Those skilled in the art will realize there are other methods for generating summaries of legal documents. Examples of such methods may be found in Schilder, F. and Kondadadi, R, *FastSum: Fast and accurate query-based multi-document summarization* as contained in the proceedings of the Joint Annual Meeting of the Association for Computational Linguistics and the Human Language Technology Conference (ACL-HLt 2008), pages 205-208, Columbus, Ohio, June 2008. CaRE-KNA™ is a Key Number Assignment™ service built upon the CaRE® indexing system using the collection of the Key Numbers™ with their corresponding Headnote texts. It can recommend the most relevant Key Numbers™ based on an input query text. The cluster module 128 groups these two sets of Key Numbers™.

For documents with no meta-data but text, the cluster module 128 applies a CaRE-KNA® service to suggest Key Numbers™ based on the text. The Key Numbers™ with the highest topic popularity are then used by the cluster module 128 to perform tasks similar to those shown in FIG. 4F to generate legal topics for the document.

After each legal topic has been identified by the cluster module 128 for a document, the cluster module 128 associates each document with the pre-defined legal clusters based on its similarity.

For example, in one embodiment, the association candidate selection process executed by the cluster module 128 is similar to the candidate selection process for merging clusters described previously. In particular, for all the clusters which can be associated to the topics in legal documents, the cluster module 128 generates the three CaRE® indices based on the word-pair features, Key Number™ profiles features, and KeyCite® citing/cited profiles features.

Figure 4G:
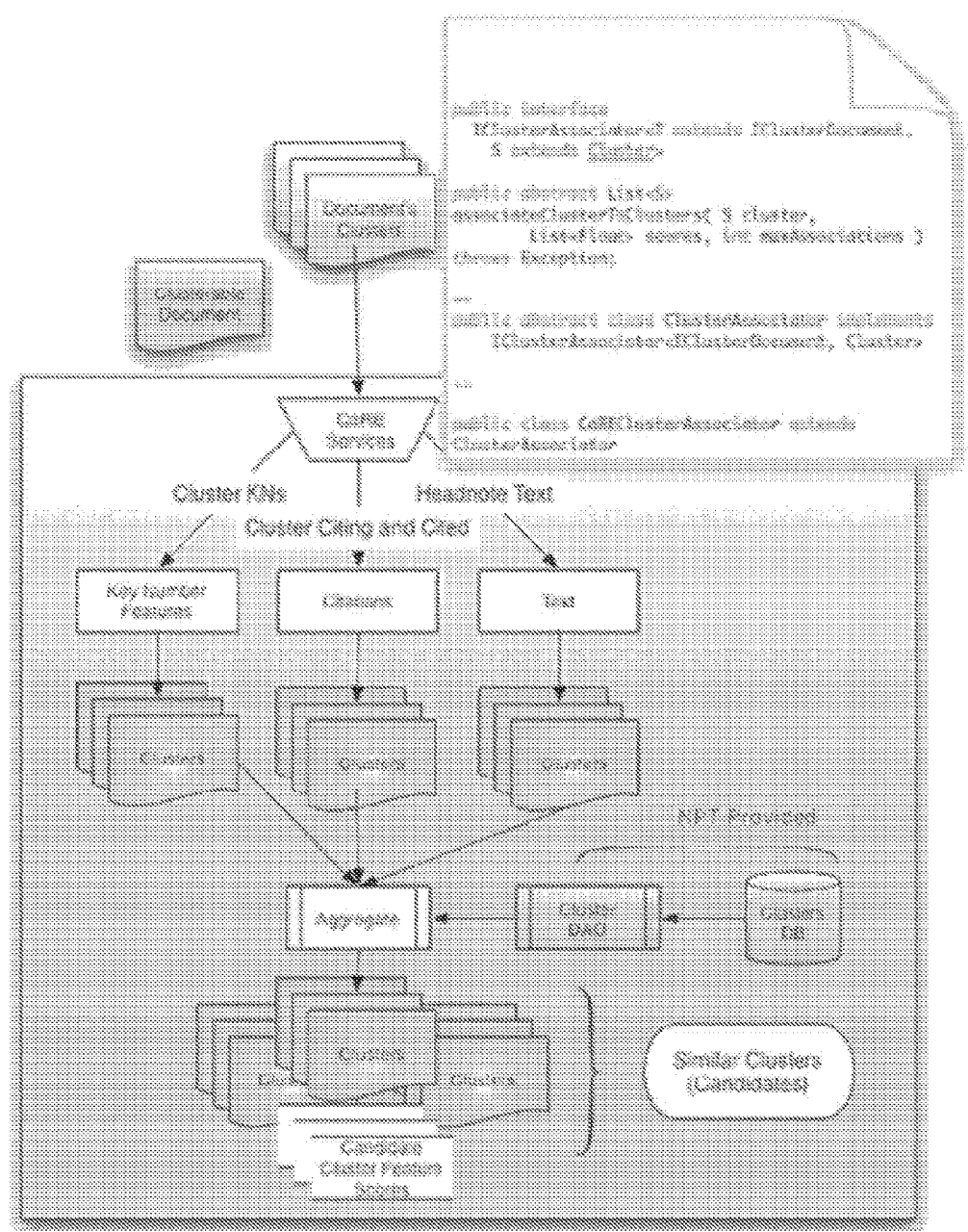
Figure 4I:
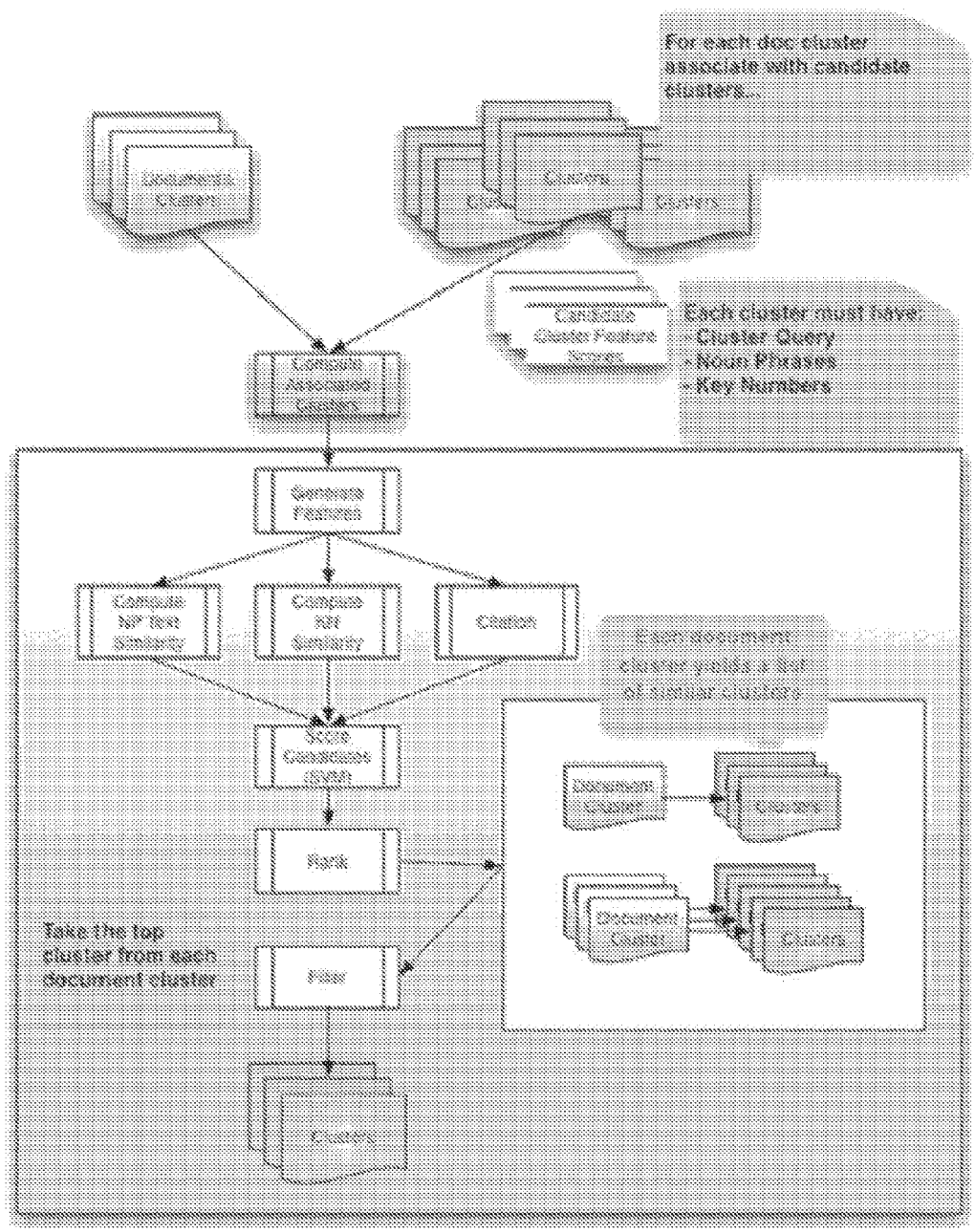
Figure 4J:
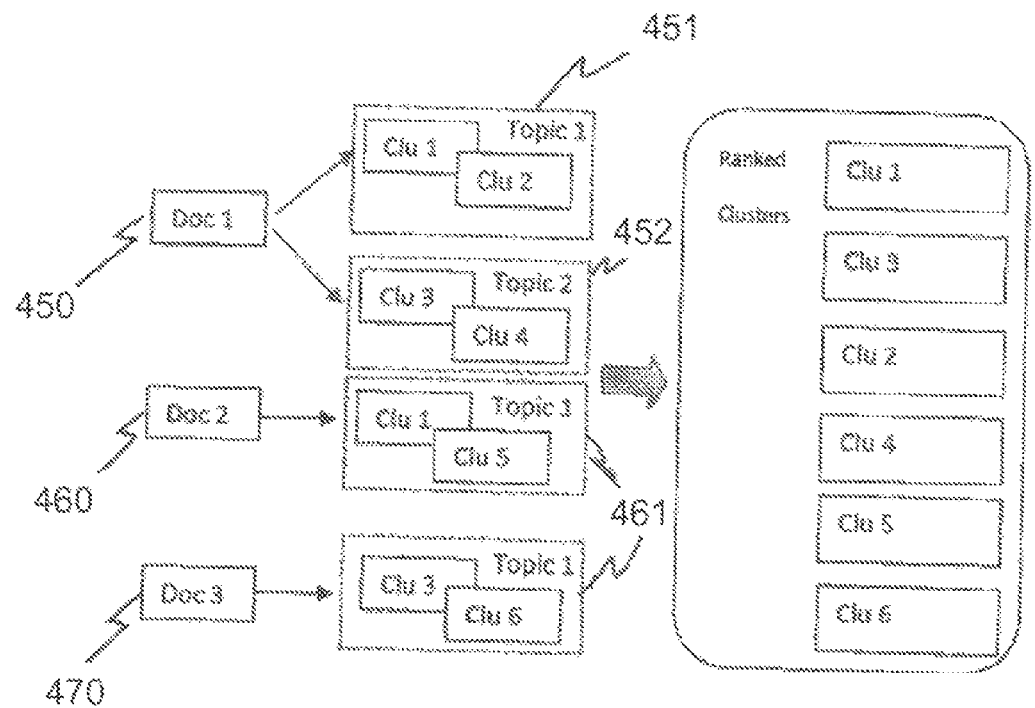

For each topic, the three sets of features described previously, namely the word-pair features based on the Headnote text, the Key Number™ profiles features, and the KeyCite® citing/cited profiles of the seeding document, are calculated by the cluster module 128 and sent to the CaRE® indices. Each CaRE® engine is used to retrieve its independent suggestions, which aggregated later to form a list of candidates to be associated. FIG. 4G shows an example flowchart of the association candidate selection process. Next, the cluster module 128 computes a list of features, as shown and described in connection with FIG. 4H. Next, the cluster module 128 applies a SVM ranker to these computed features. The cluster module 128 then selects the top scored candidates as the associated clusters to the topics. FIG. 4I shows a flowchart illustrating this process.

In one embodiment, the cluster module 128 associates sets of documents stored in folders with a set of document recommendations that address the same legal issue(s) which are relevant to the original document set. For example, in the Westlaw® system, a "Research Folder" is a place where a user can store together one's documents of interest. The research folder can contain various numbers of documents and various document types. This folder-based document recommendation method executed by the cluster module 128 identifies common topics (legal issues) among these foldered documents and proceeds to return additional relevant documents that discuss the same topics.

Figure 4K:
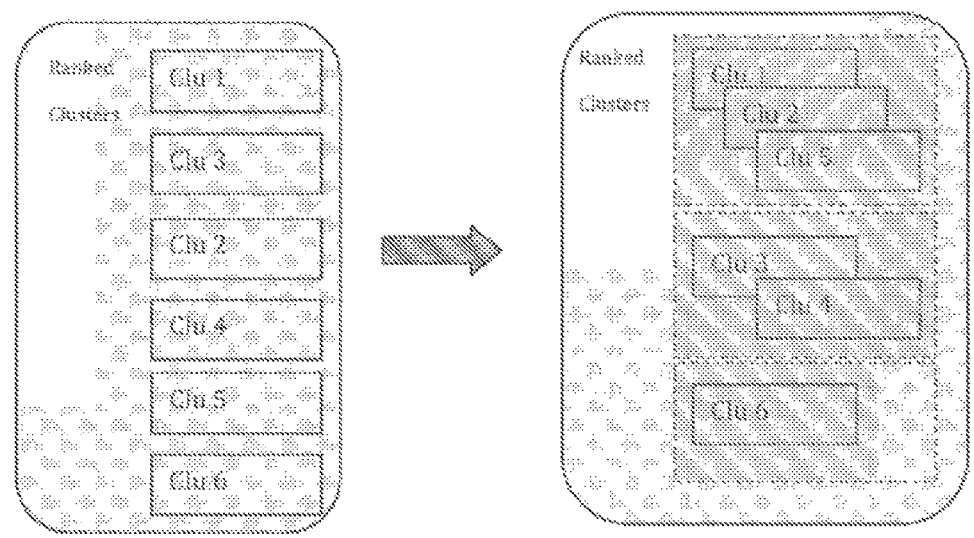
Figure 4L:
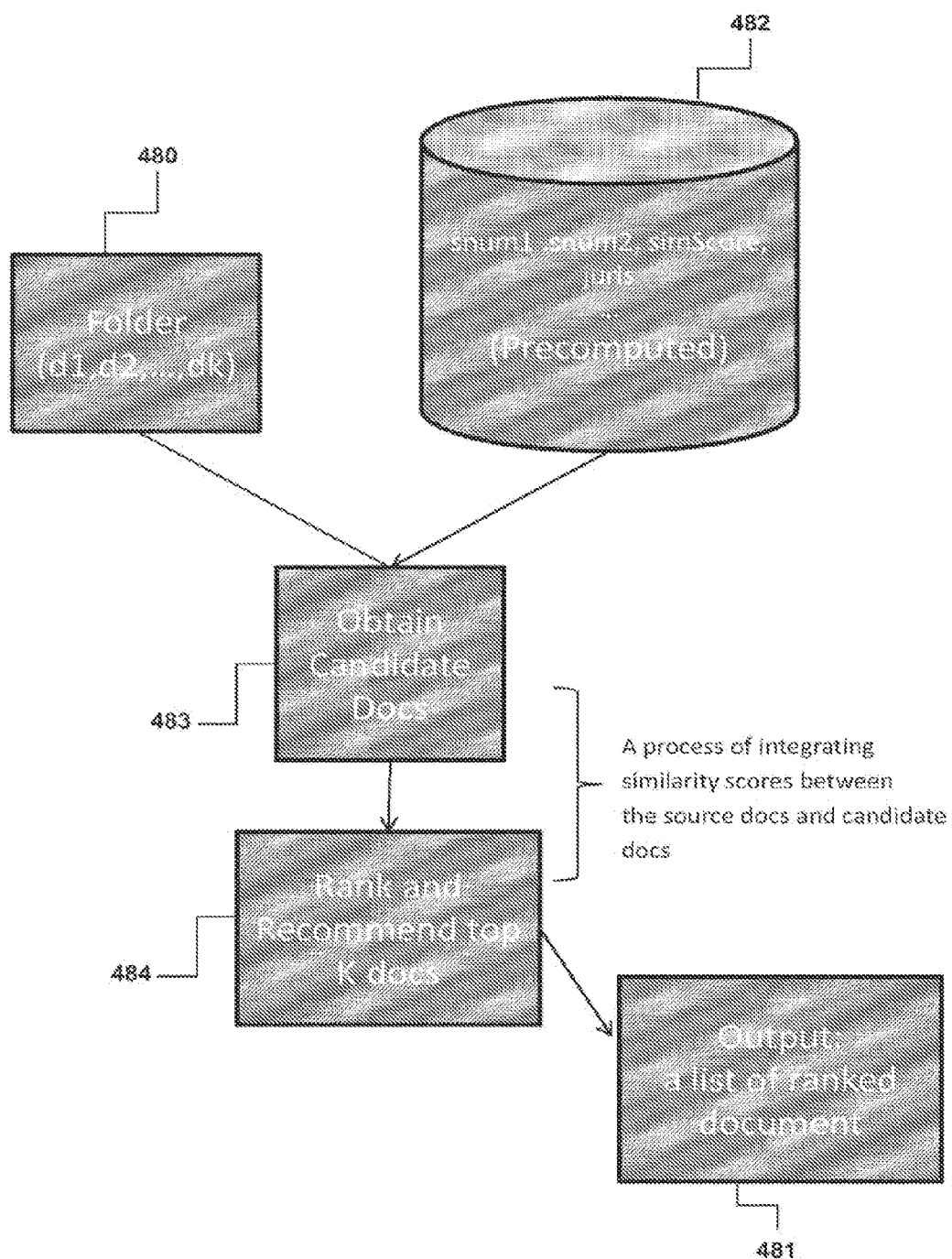

For example, in one embodiment, input to the method is a list of documents, such as cases, statutes, and regulations found in a folder box 480 of FIG. 4L. The output of the method is a list of additional documents addressing the same distinct legal issues. The method involves two steps. The cluster module 128 first detects topics and then retrieves the additional documents which share the same legal issues as shown in functional box 481 of FIG. 4L.

In the topic similarity detection step, which takes place in functional box 482, the cluster module 128 uses the relationships among the documents in a folder to find additional relevant documents. Advantageously, instead of utilizing the document content itself, which may be computationally expensive, these relationships identified in the document metadata are exploited.

These document relationships are quantified by a similarity matrix based on two sources of information. One is the cluster memberships of the documents in the folders. The second is the citation information associated with the documents, citing as well as cited citation information.

The dimension of the similarity matrix is n×n, where n is, for example, the number of legal cases. Such a matrix could also include other document types such as legal briefs, for example. Each entry of the matrix, is the similarity score of the document in row i and the document in column j. In the typical embodiment, the matrix is sparse (that is, the majority of the entries have 0 values). This property allows for an efficient storage of the entries in a database.

The matrix is computed offline and the results (entries) are stored in a database (which is part of 482 of FIG. 4L. On the online side, an item-based top-N ranking algorithm is used in functional blocks 483 and 484 to "recommend" the top N documents in response to the documents stored in folders 480.

In practice, one matrix is generated based on document cluster memberships and another matrix is generated based on document citation information. Since both cluster membership and citation information can be used, there can be two scores that exist between two documents.

Once these matrices have been generated offline, on the online side, the inputs of the recommendation algorithm are the document identifiers of the source documents (from the given folder) along with other useful metadata, for example, the jurisdictions of the documents. In one embodiment, where two sources of information are used, two recommendation algorithms are in fact run, one based on membership, the other based on citation information, ranking results from both and then combining these results. Below is a set of pseudocode for the recommendation algorithm based upon cluster memberships.

Recommended docs based on memberships
Input: $f_1, f_2, f_n$, jurisdiction ($f_i$ is a case in the target folder i), n > 2

Steps:
1. Get $d_k$ (the kth document) for each $s_i$ (the similarity score) where sim1 $(s_i, s_j)$ >= 0.05 in the same jurisdiction
   If sim1$(d_k, s_i)$ > 0.05, count$(d_k)$++
2. Compute $w(s_i)$, which is the pagerank of $s_i$ based on the graph with source cases only
3. Compute score$(d_k)$, if count$(d_k)$ is not less than T (an empirical threshold of 500)
   T = max(M, M/2 + 2), M is the number of $s_i$ whose $w(s_i)$ > 0

$$\text{score}(d_k) = \text{count}(d_k) \times \sum_{s_i} (\text{sim1}(d_k, s_i) \times w(s_i))$$

4. Rank $d_k$ based on the score from step 3
Output: a list of top k cases (k <= 10) with its ranking In another embodiment, one could make recommendations in response to documents in a folder that are in fact clusters rather than documents. Such an embodiment may aggregate clusters among those associated to the documents in the folders, and may assign each cluster a combined score (defined as $S_{COMB}$). The cluster module 128 then sorts these scores in descending order. The cluster module 128 computes the combined score $S_{COMB}$ based on topic scores $S_{TP}$ (rank can be implied as well, defined as $R_{TP}$), cluster scores $S_{AC}$ (rank can be implied as well, defined as $R_{AC}$), and the frequency count (defined as f).

For example, referring to Fig. J, one folder includes three documents (Doc 1 450, Doc 2 460, and Doc 3 470). The first document (Doc 1 450) includes two topics (Topic 1 451 and Topic 2 452), and the second and third documents include one topic (Topic 1 461). Further, each topic is associated with two clusters (Clu N). The combined score $S_{COMB}$ computed for Clu 1 is a combination of frequency count (f=2 since the Clu 1 is associated in two topics), scores from topics $S_{TP}$ (two scores, one from Doc 1->Topic 1, and another from Doc 2->Topic 1), ranks from topics $R_{TP}$ (rank is inferred by the scores and normalized based on a power based function, clusters from lower ranked topics use a lower weight), scores from association $S_{AC}$, and ranks from association $R_{AG}$ (similar normalization is applied). The cluster module 128 computes the combined scores $S_{COMB}$ for other clusters in a similar fashion. In one embodiment, the cluster module implements the following formula to compute the combined score $S_{COMB}$ for each of the clusters, $$S_{COMB} = \sum_{i=1}^{f} \left( S_{TP_i} \times B^{(R_{TP_i}-1)} \times S_{AC_i} \times B^{(R_{AC_i}-1)} \right)$$

where B is a constant, i is the ith cluster, and $R_x$=1, 2, . . . . Preferably, B is equal to 0.9. An example of output generated by the cluster module 128 after topic detection is shown in Fig. J.

In the topic consolidation step, the cluster module 128 condenses the aggregated clusters into groups such that each group contains highly "similar" clusters, and a representative cluster is selected to for each of the group.

For example, in one embodiment, the cluster module 128 scans through the ordered clusters list and performs a pairwise similarity comparison between clusters using the information extracted from their queries, namely the NPs and the Key Numbers™. For clusters with similarity scores above a certain thresholds, the cluster module 128 merges those clusters into a single group. In one implementation using a range of similarity scores from 1 through 5 (with 5 being the most similar), the threshold is 2.7. The cluster module 128 then selects the cluster ranked highest in the ordered list (from the topic detection step described previously with reference, in part, to FIG. 4J) to be the representative of the group. The cluster module 128 computes the score of the selected group as the sum of the scores of the clusters in the group. The remainder of the clusters in the group are not visible as output of the algorithm. After the comparison is complete, the cluster module 128 sorts the cluster groups by group score in descending order.

Example output of the topic consolidation step is shown on the right side of FIG. 4K. As shown in FIG. 4K, in the output, the cluster module 128 grouped clusters Clu 1, Clu2 and Clu5 together, as these clusters were determined to be similar. Also, clusters Clu 3 and Clu 4 were determined to be similar and thus grouped together. The cluster module 128 then uses the Clu 1 cluster as being representative of the first group, and cluster Clu 3 as being representative of the second group. Clusters Clu 2, Clu5 and Clu4 are not made available in the output.

The cluster module 128 also provides a query to clusters association. The method of query to cluster association used by the cluster module 128 is similar to the process described in connection with documents having no meta-data. In this case, the query is considered the text. Reference may be made to FIG. 4F and associated description for a more detailed explanation.

While the various sections of the detailed description above are intended to illustrate and teach ways of practicing the current invention, those skilled in the art will appreciate that the invention is not limited to the detailed description. For example, the invention may be used in other information solutions environments relating to, e.g., financial information, health information, tax and accounting information, scientific information and/or combinations of the same. Thus, the scope of the invention is defined by the claims below and their equivalents.

What we claim is:

1. A method comprising:
    receiving a search request signal, the search request signal comprising a search request for a set of legal information;
    identifying a set of legal documents in response to the search request signal;
    transmitting a search response signal associated with the set of legal documents;
    receiving a selection signal, the selection signal indicative of a selection of a given legal document from the set of legal documents, the legal document being associated with a set of metadata;
    based upon the set of metadata, selecting a first cluster of legal documents, the first cluster of legal documents being a first set of documents comprising one or more primary resources and one or more secondary resources grouped according to a first legal topic which the first set of documents hold in common,
        wherein the selecting of the first cluster of legal documents is based upon:
            a first similarity score between the legal document and the first set of documents belonging to the first cluster of legal documents, wherein the first similarity score is based upon a measure of associated citation information between the legal document and the first set of documents wherein the associated citation information comprises editorial annotations, hierarchical categorization of legal topics, and relationship between legal topics; and
    transmitting a second signal relating to the first cluster of legal documents.

2. The method of claim 1 wherein upon receiving the transmitted second signal, displaying results in a topical display.

3. The method of claim 2 wherein the topical display comprises a first portion relating to the first legal topic.

4. The method of claim 1 wherein the first similarity score is further based upon a measure of a common noun phrase frequency between the legal document and the first set of documents.

5. A system comprising:
    a processor;
    a memory operatively coupled to the processor, the memory storing instructions that cause the processor to:
        receive a search request signal, the search request signal comprising a search request for a set of legal information;
        identify a set of legal documents in response to the search request signal, the set of legal documents comprising the legal document;
        transmit a signal associated with the set of legal documents;
        receive a selection signal, the selection signal indicative of a selection of a given legal document from the set of legal documents, the legal document being associated with a set of metadata;
    based upon the set of metadata, select a first cluster of legal documents, the first cluster of legal documents being a first set of documents comprising one or more primary resources and one or more secondary resources grouped according to a first legal topic which the first set of documents hold in common,
        wherein selecting the first cluster of legal documents is based upon:
            a first similarity score between the legal document and a first set of documents belonging to the first cluster of legal documents, wherein the first similarity score is based upon a measure of associated citation information between the legal document and the first set of documents; wherein the associated citation information comprises editorial annotations, hierarchical categorization of legal topics, and relationship between legal topics; and
    transmit a second signal relating to the first cluster of legal documents.

6. The system of claim 5 wherein upon receiving the transmitted second signal, displaying results in a topical display.

7. The system of claim 6 wherein the topical display comprises a first portion relating to the first legal topic.

8. The system of claim 5 wherein the first similarity score is further based upon a measure of a common noun phrase frequency between the legal document and the first set of documents.

9. Non-transitory computer readable media comprising program code stored thereon for execution by a programmable processor to perform a method for searching legal documents, the computer readable media comprising:
    program code for receiving a search request signal, the search request signal comprising a search request for a set of legal information;
    program code for identifying a set of legal documents in response to the search request signal;
    program code for transmitting a search response signal associated with the set of legal documents;

program code for receiving a selection signal, the selection signal indicative of a selection of a given legal document from the set of legal documents, the legal document being associated with a set of metadata; based upon the set of metadata, selecting a first cluster of legal documents, the first cluster of legal documents being a first set of documents comprising one or more primary resources and one or more secondary resources grouped according to a first legal topic which the first set of documents hold in common, wherein the selecting of the first cluster of legal documents is based upon:

a first similarity score between the legal document and the first set of documents belonging to the first cluster of legal documents, wherein the first similarity score is based upon a measure of associated citation information between the legal document and the first set of documents; wherein the associated citation information comprises editorial annotations, hierarchical categorization of legal topics, and relationship between legal topics; and program code for transmitting a second signal relating to the first cluster of legal documents.

10. The non-transitory computer readable media program code for transmitting a second signal relating to the first cluster of legal documents of claim 9 when it is received, processed, and displayed, upon receiving the transmitted second signal, displaying results in a topical display.

11. The non-transitory computer readable media of claim 10 wherein the topical display comprises a first portion relating to the first legal topic.

12. The non-transitory computer readable media of claim 9 wherein the first similarity score is further based upon a measure of a common noun phrase frequency between the legal document and the first set of documents.

13. A method comprising:

receiving a search request signal, the search request signal comprising a search request for a set of legal information;

identifying a set of legal documents in response to the search request signal;

transmitting a search response signal associated with the set of legal documents;

receiving a selection signal, the selection signal indicative of a selection of a given legal document from the set of legal documents, the legal document being associated with a set of metadata;

based upon the set of metadata, selecting a first cluster of legal documents, the first cluster of legal documents being a first set of documents comprising one or more primary resources and one or more secondary resources grouped according to a first legal topic which the first set of documents hold in common, wherein the selecting of the first cluster of legal documents is based upon:

ranking a first similarity score between the legal document and the first set of documents belonging to the first cluster of legal documents, wherein the first similarity score is based upon a measure of associated citation information between the legal document and the first set of documents; wherein the associated citation information comprises editorial annotations, hierarchical categorization of legal topics, and relationship between legal topics; and transmitting a second signal relating to the first cluster of legal documents.

14. The method of claim 13 wherein upon receiving the transmitted second signal, displaying results in a topical display.

15. The method of claim 14 wherein the topical display comprises a first portion relating to the first legal topic.

16. The method of claim 13 wherein the first similarity score is further based upon a measure of a common noun phrase frequency between the legal document and the first set of documents.

\* \* \* \* \*